(12) United States Patent
Matsubara et al.

(10) Patent No.: US 8,079,912 B2
(45) Date of Patent: Dec. 20, 2011

(54) POWER TRANSMISSION SPLINE

(75) Inventors: Yukio Matsubara, Iwata (JP); Hiroo Morimoto, Iwata (JP)

(73) Assignee: NTN Corporation, Osaka (JP)

( * ) Notice: Subject to any disclaimer, the term of this patent is extended or adjusted under 35 U.S.C. 154(b) by 238 days.

(21) Appl. No.: 12/310,841

(22) PCT Filed: Sep. 5, 2007

(86) PCT No.: PCT/JP2007/067305
§ 371 (c)(1),
(2), (4) Date: Mar. 10, 2009

(87) PCT Pub. No.: WO2008/032626
PCT Pub. Date: Mar. 20, 2008

(65) Prior Publication Data
US 2009/0270187 A1    Oct. 29, 2009

(30) Foreign Application Priority Data

Sep. 11, 2006   (JP) ................... 2006-245884
Sep. 11, 2006   (JP) ................... 2006-245894
Sep. 11, 2006   (JP) ................... 2006-245896
Sep. 11, 2006   (JP) ................... 2006-245905

(51) Int. Cl.
*F16D 3/226*   (2006.01)
(52) U.S. Cl. ...... 464/145; 464/905; 464/906; 403/359.6
(58) Field of Classification Search ................. 464/145, 464/182, 143, 158, 904–906; 403/359.1, 403/359.6, 298
See application file for complete search history.

(56) References Cited

U.S. PATENT DOCUMENTS

| | | | |
|---|---|---|---|
| 6,142,033 A | 11/2000 | Beigang | |
| 6,484,384 B1 | 11/2002 | Gibson et al. | |
| 6,685,572 B2* | 2/2004 | Makino et al. | 464/182 |
| 2003/0017878 A1* | 1/2003 | Muju et al. | 464/157 |
| 2005/0101392 A1* | 5/2005 | Sakurai et al. | 464/182 |
| 2005/0107169 A1* | 5/2005 | Sakurai et al. | 464/179 |
| 2006/0291954 A1 | 12/2006 | Igarashi et al. | |

(Continued)

FOREIGN PATENT DOCUMENTS

EP    1 533 534    5/2005

(Continued)

OTHER PUBLICATIONS

International Preliminary Report on Patentability and Written Opinion of the International Searching Authority mailed Mar. 26, 2009 for International Application No. PCT/JP2007/067305.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A power transmission shaft mitigates the concentration of both tensile stress and shear stress to achieve an improvement in terms of fatigue strength. A male spline section is formed on an outer periphery of the power transmission shaft. On a valley section of the male spline section, at an axially opposite end side portion thereof, there is provided a diameter-expanded section whose outer diameter dimension is gradually increased toward an axially opposite end. Rounded sections having a circular arc cross-section are provided on both circumferential sides of the diameter-expanded section. A radius of curvature of the rounded sections is gradually increased toward the axially opposite end.

20 Claims, 24 Drawing Sheets

U.S. PATENT DOCUMENTS

| | | |
|---|---|---|
| 2008/0152424 A1 | 6/2008 | Igarashi et al. |
| 2008/0190165 A1 | 8/2008 | Sakurai et al. |

FOREIGN PATENT DOCUMENTS

| | | |
|---|---|---|
| EP | 1 653 099 | 5/2006 |
| EP | 1 653 100 | 5/2006 |
| EP | 2 065 605 | 6/2009 |
| JP | 11-514079 | 11/1999 |
| JP | 2005-69475 | 3/2005 |
| JP | 2005-147367 | 6/2005 |
| JP | 2006-83963 | 3/2006 |
| WO | 2005/015040 | 2/2005 |
| WO | 2005/015041 | 2/2005 |
| WO | 2008/032532 | 3/2008 |

OTHER PUBLICATIONS

International Search Report mailed Dec. 11, 2007 for International Application No. PCT/JP2007/067305.

Supplementary European Search Report dated Dec. 10, 2010 in corresponding European Application No. 07806748.5.

* cited by examiner

A-A

B-B

C-C

D-D

| C | Si | Mn | P | S | Cu | Ni | Cr | B |
|---|---|---|---|---|---|---|---|---|
| 0.39 | 0.05 | 0.97 | 0.014 | 0.017 | 0.18 | 0.05 | 0.11 | 0.0017 |

FIG. 10a
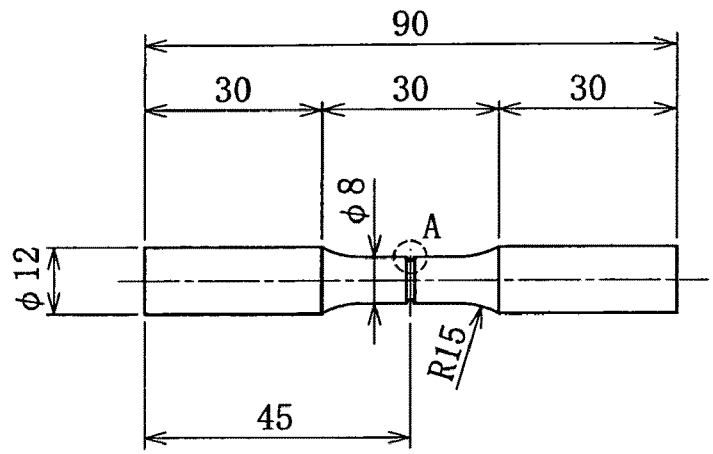
FIG. 10b
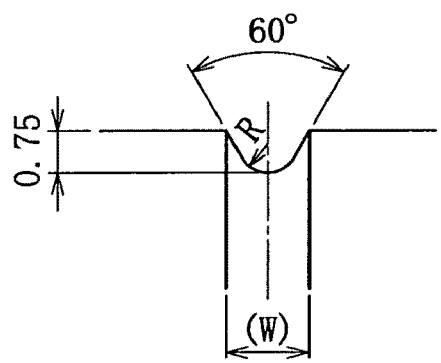
FIG. 10c
| R (mm) | W (mm) | STRESS CONCENTRATION COEFFICIENT $\alpha$ |
|---|---|---|
| 0.10 | 0.98 | 3.5 |
| 0.15 | 1.04 | 3.0 |
| 0.25 | 1.15 | 2.5 |
| 0.50 | 1.44 | 2.0 |
| 1.40 | 2.48 | 1.5 |

FIG. 11a
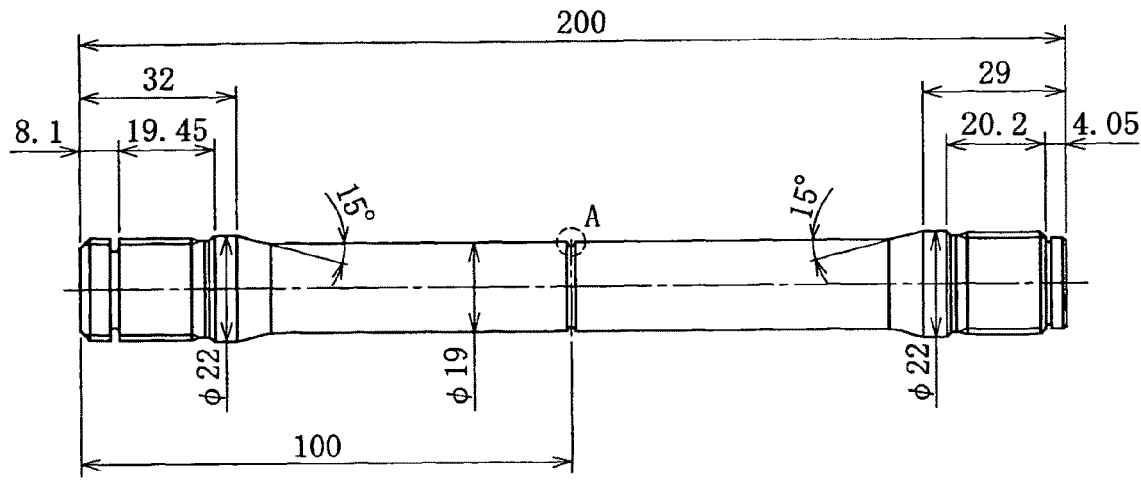
FIG. 11b
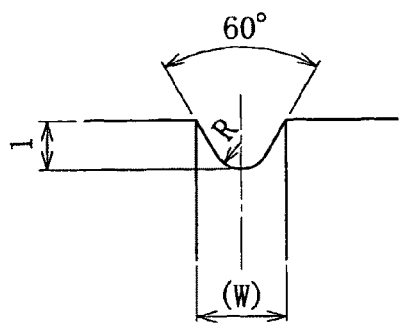
FIG. 11c
| R(mm) | W(mm) | STRESS CONCENTRATION COEFFICIENT α |
|---|---|---|
| 0.15 | 1.33 | 3.0 |
| 0.25 | 1.44 | 2.5 |
| 0.50 | 1.73 | 2.0 |
| 1.40 | 2.77 | 1.5 |

FIG. 16
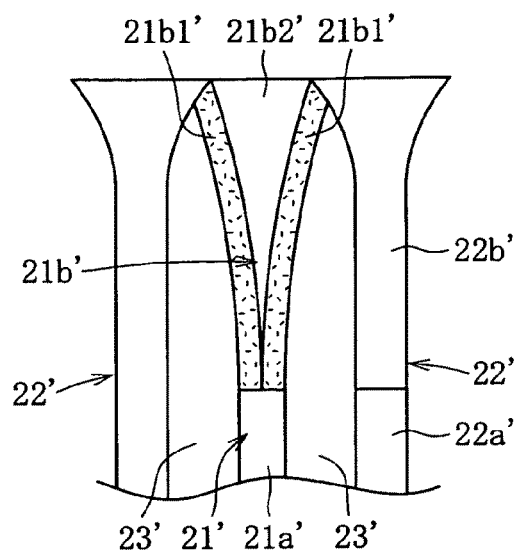
FIG. 17a
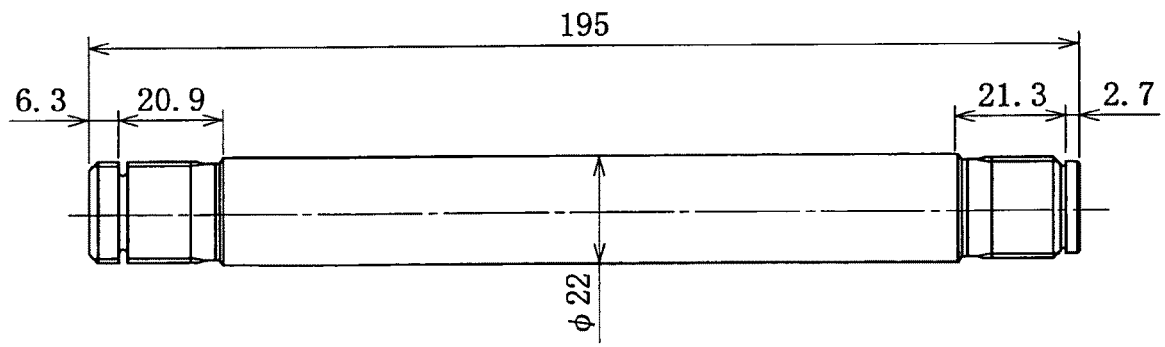
FIG. 17b
| D.P. | PRESSURE ANGLE | NUMBER OF TEETH | P.C.D | LARGE DIAMETER | SMALL DIAMETER |
|---|---|---|---|---|---|
| 32/64 | 37.5° | 26 | 20.638mm | 21.438mm | 19.357mm |

POWER TRANSMISSION SPLINE

TECHNICAL FIELD

The present invention relates to a power transmission shaft connected via a female member and a spline (inclusive of a serration, which applies to the following description).

Further, the present invention relates to a plunging type constant velocity universal joint allowing axial displacement between two shafts and angular displacement between two shafts, and a fixed type constant velocity universal joint not allowing axial displacement between two shafts but solely allowing angular displacement between two shafts, and further, to a power transmission spline effecting torque transmission between a male member and a female member.

BACKGROUND ART

Recently, general interest in environmental issues is on the increase, and, regarding, for example, automobiles, there is a strong demand for an enhancement in emission control, an improvement in fuel efficiency, etc. In this context, there is a strong demand for a further reduction in the weight and an enhancement in the strength of power transmission shafts to be used as drive shafts, propeller shafts, or the like. Many of those power transmission shafts have a spline section in the outer peripheral surface thereof. Through fit-engagement of the spline section (male spline section) of a power transmission shaft and the spline section (female spline section) of a female member to be fitted onto the power transmission shaft, the power transmission shaft and the female member are connected together, and rotational power is transmitted.

There is required high strength of a power transmission shaft having a male spline section, and hence, usually, steel is used as the material. After forming the male spline section by rolling, press working, or the like, at least the male spline section is hardened for use through quenching. The female spline section is often formed through broaching or the like. As the method of hardening after forming, induction hardening through quenching is often adopted. In some cases, immersion quenching, carburizing and quenching, or the like is adopted.

FIG. 8 is a plan view of a so-called round up type male spline section in which the end portion opposite to the shaft end (left-hand side in the drawing) of a valley section 100 is connected to the outer peripheral surface (smooth portion) 101 of a male member via a diameter-expanded section 102 whose outer diameter is gradually increased. Fatigue fracture of a spline section of this type usually occurs near the connection between the valley section 100 and the diameter-expanded section 102 or in the diameter-expanded section 102. In this case, there are two modes in which a crack is generated: one due to tensile stress concentrated on portion A, and one due to shear stress concentrated on portion B. In the case of steel, when the Vickers hardness is less than 700, shear stress is predominant. When the Vickers hardness is 700 or more and in the case of pulsating torsional fatigue, tensile stress is predominant.

Up to now, several methods have been proposed as means for achieving an improvement in terms of the fatigue strength of a spline section. For example, Patent Document 1 discloses a technology for mitigating stress concentration by blunting the boundary between a diameter-expanded section and a tooth surface. Patent Document 2 discloses a strength enhancing technology according to which, instead of arranging one diameter-expanded section as usual, two or more diameter-expanded sections are arranged side by side.

Patent Document 1: JP 2005-147367 A
Patent Document 2: JP Hei 11-514079 A

SUMMARY OF THE INVENTION

Problem to be Solved by the Invention

However, while the technology disclosed in Patent Document 1 admittedly proves to be effective in mitigating tensile stress concentration, it is still inadequate for mitigating shear stress concentration. Further, while the technology disclosed in Patent Document 2 allows mitigation of shear stress concentration, it is insufficient from the viewpoint of mitigating tensile stress concentration. In this way, while there exists a technology helping to mitigate one of the two types of stress causing crack generation, no technology is available which helps to mitigate both, which means there is still room for improvement from the viewpoint of realizing a further improvement in terms of fatigue strength.

In view of this, it is an object of the present invention to mitigate concentration of both tensile stress and shear stress at the male spline section, thus achieving an improvement in terms of fatigue strength of a power transmission shaft, a constant velocity universal joint having a shaft section (stem section) for power transmission, and a male member.

Means for Solving the Problem

The inventors of the present invention produced a specimen which had a notch in a parallel section, subjecting it to rotational bending fatigue test and torsional fatigue test to obtain the relationship between stress concentration coefficient and fatigue strength.

As the specimen, the inventors of the present invention used a medium carbon steel of the same lot of the chemical composition as illustrated in FIG. 9, producing a specimen of a configuration and size (mm) as illustrated in FIGS. 10a and 11a. FIG. 10a illustrates a specimen for rotational bending fatigue test, and FIG. 11a illustrates a specimen for torsional fatigue test. For the specimen for the rotational bending fatigue test, five levels were adopted for the radius of curvature of the notch tip: 0.10, 0.15, 0.25, 0.50, and 1.40, respectively setting the stress concentration coefficient α of each of them to 3.5, 3.0, 2.5, 2.0, and 1.5 (see FIG. 10c). For the specimen for the torsional fatigue test, four levels were adopted for the radius of curvature of the notch tip: 0.15, 0.25, 0.50, and 1.40, respectively setting the stress concentration coefficient α of each of them to 3.0, 2.5, 2.0, and 1.5 (see FIG. 11c). Induction hardening was treated on the parallel sections of all the specimens including the notches, and then low temperature tempering was treated thereon. After the heat treatment, all the specimens exhibited a surface hardness of approximately HV 650.

First, the rotational bending fatigue test was conducted by the Ono rotational bending fatigue testing machine at room temperature in atmospheric air at a load frequency of 50 Hz.

In the rotational bending fatigue test, irrespective of the notch level, crack generation occurred along the notch bottom, resulting in fracture. In the crack generation mode in this case, tensile stress is predominant. Until fracture occurs, that is, until the number of times of loading exceeds around $10^5$, the fatigue curve was lowered in accordance with the decrease in stress amplitude. When the stress amplitude becomes less than a threshold value, fracture ceased to occur, thus indicating an obvious fatigue limit phenomenon. Here, the stress amplitude is a nominal stress amplitude not dependent on the notch level, and means the amplitude of the maximum tensile stress operating on the surface when the same bending moment as that in the fatigue test is imparted to a smooth round bar having a notch bottom diameter of (ø6.5 mm).

FIG. 12 illustrates the relationship between the stress concentration coefficient $\beta_o$ and the fatigue limit obtained in the above-mentioned rotational bending fatigue test. As illustrated in the drawing, the fatigue strength increased as $\alpha_o$ decreased. However, as indicated by the dashed lines in the drawing, it was found out that the gradient of the fatigue curve is large when $\alpha_o \leq 2.7$, which more conspicuously indicates an improvement in terms of fatigue strength when $\alpha_o$ is reduced.

Next, the torsional fatigue test was conducted by an electro-hydraulic servo fatigue testing machine through torque control at room temperature in atmospheric air under at a load frequency of 2 Hz under the completely reversed loading condition (stress ratio R=−1).

In the torsional fatigue test, irrespective of the notch level, crack generation occurred along the notch bottom, resulting in fracture. In the crack generation mode in this case, the shear stress is predominant. The reversed torsional fatigue test was conducted until the number of times of loading reached a maximum value of around $10^6$. In this range, the fatigue curve was lowered as the stress amplitude decreased. Here, the stress amplitude refers to a nominal stress amplitude not dependent on the notch level, and means the amplitude of the maximum shear stress operating on the surface when the same torsional torque as that in the fatigue test is imparted to a smooth round bar having a notch bottom diameter of (ø17 mm).

FIG. 13 illustrates the relationship between the stress concentration coefficient $\alpha_\tau$ and the fatigue strength at $10^5$ times obtained in the reversed torsional fatigue test. As illustrated in the drawing, the fatigue strength increased as $\alpha_\tau$ decreased. However, as indicated by the dashed lines in the drawing, it was found out that the gradient of the fatigue curve is large when $\alpha_\tau \leq 2.1$, which more conspicuously indicates an improvement in terms of fatigue strength when $\alpha_\tau$ is reduced.

From the above, it has been found out that whichever of tensile stress or shear stress may be predominant in crack generation, an improvement in terms of fatigue strength is achieved through mitigation of stress concentration. In particular, it has been found out that the stress concentration mitigating effect is enhanced when $\pi_o \leq 2.7$ in the case of tensile stress and when $\alpha_\tau \leq 2.1$ in the case of shear stress. Thus, in the diameter-expanded section of a male spline section, which undergoes fatigue fracture in both breakage modes, it is desirable to effect configuration tuning such that the maximum value $\sigma_{1max}$ of the maximum principal stress concentrated thereon is 2.7 times or less of the reference stress $\tau_0$ ($\sigma_{1max} \leq 2.7\tau_0$), and that the maximum value $\tau_{\theta max}$ of the axial shear stress is 2.1 times or less of the reference stress $\tau_0$ ($\tau_{\theta zmax} \leq 2.1\tau_0$). Here, assuming that T is the torque, that $d_0$ is the diameter of the bottom of the valley section of the male spline section illustrated in FIG. 6, and that $d_i$ is the inner diameter of the male spline section (in the case in which the spline section is hollow; in the case of a solid spline section, $d_i$=0), the reference stress $\tau_0$ is a value that can be expressed by the following equation:

$$\tau_0 = 16Td_0/[\pi(d_0^4 - d_i^4)]$$

The inventors of the present invention effected various configuration tunings on the diameter-expanded section and found out that, by providing a rounded section on both sides in the circumferential direction of the diameter-expanded section of the male spline section and gradually increasing the radius of curvature of the rounded sections toward the side opposite to the shaft end, it is possible to satisfy the conditions: $\sigma_{1max} \leq 2.7\tau_0$, and $\tau_{\theta zmax} \leq 2.1\tau_0$.

Next, by using a material of the same composition (see FIG. 9) as that of the notch fatigue specimens of FIGS. 10(a) and 11(a), a shaft-shaped specimen having a male spline section at both axial ends was produced (see FIG. 17a), and the reversed torsional fatigue test and pulsating torsional fatigue test were conducted by using this specimen. In accordance with the involute spline specifications illustrated in FIG. 17b, there were produced two kinds of specimen: one according to the present invention, and one according to the prior art. Induction hardening and tempering were treated entirely on those specimens in atmospheric air and under the same conditions. The reversed torsional fatigue test was conducted in four levels of torsion torque amplitude ranging from 850 to 1300 Nm, and, in the pulsating torsional fatigue test, maximum torsional torque in four levels ranging from 1250 to 2000 Nm was imparted. FIG. 18 illustrates a T/N chart obtained from the reversed torsional fatigue test, and FIG. 19 illustrates a T/N chart obtained from the pulsating torsional fatigue test. As is apparent from the charts, in the present invention, it is possible to achieve a substantial improvement of fatigue strength over the prior art in terms of both reversed torsional fatigue test and pulsating torsional fatigue test.

From the above, the present invention is characterized by the following:

In a power transmission shaft which is provided with a male spline section in an outer periphery thereof and which has at one axial end side of a valley section of the male spline section a diameter-expanded section whose outer diameter dimension is gradually increased, rounded sections are provided on both circumferential sides of the diameter-expanded section of the male spline section, with a radius of curvature of the rounded sections being gradually increased toward one axial end.

Assuming that respective maximum values of a maximum principal stress and an axial shear stress operating on the diameter-expanded section of the male spline section when a torque T is applied are $\sigma_{1max}$ and $\tau_{\theta zmax}$, and that a reference stress given by the following formula 1) is $\tau_0$ with respect to the torque T, a diameter $d_0$ of the valley section of the male spline section, and an inner diameter $d_i$ of the male spline section, the following formulas 2) and 3) are simultaneously satisfied.

$$\tau_0 = 16Td_0/[\pi(d_0^4 - d_i^4)] \quad \quad 1)$$

$$\sigma_{1max} \leq 2.7\tau_0 \quad \quad 2)$$

$$\tau_{\theta zmax} \leq 2.1\tau_0 \quad \quad 3)$$

Through examination, the inventors of the present invention found out that, in the above-mentioned construction, it is possible to satisfy the above-mentioned formulas 2) and 3) by effecting range setting as follows: $0.05 \leq dR/dL \leq 0.60$, and $5° \leq \theta \leq 20°$, where dR/dL is the increase ratio of the radius of curvature of the rounded sections, and $\theta$ is the angle of the straight line connecting the small diameter end and the large diameter end of the axial cross-section of the diameter-expanded section.

It is desirable for the male spline section of a power transmission shaft be hardened by, for example, induction hardening. Further, by effecting shot peening on the male spline section of the power transmission shaft, it is possible to further enhance the fatigue strength of the male spline section.

A plunging type constant velocity universal joint according to the present invention is characterized by including: an outer joint member having in an outer periphery thereof a stem portion having the male spline section; an inner joint member accommodated in an inner diameter portion of the outer joint member; and a torque transmission member provided between the outer joint member and the inner joint member and adapted to transmit torque.

A fixed type constant velocity universal joint according to the present invention is characterized by including: an outer joint member having a stem portion and a mouth portion, the male spline section, which being formed in an outer periphery of the stem portion, a track groove, which being formed in an inner periphery of the mouth portion; an inner joint member having a track groove in an outer periphery thereof; torque transmission balls arranged in a ball track formed by the track groove of the outer joint member and the track groove of the inner joint member; and a cage retaining the torque transmission balls at equal circumferential intervals.

A power transmission spline according to the present invention is characterized by including: the male spline section provided in an outer periphery of a male member; and a female spline section provided in an inner periphery of a female member and fit-engaged with the male spline section.

Effects of the Invention

As described above, according to the present invention, it is possible to mitigate both tensile stress concentration and shear stress concentration in a male spline section. Thus, it is possible to provide a power transmission shaft, a plunging type constant velocity universal joint, a fixed type constant velocity universal joint, and a power transmission spline having higher fatigue strength.

Figures 4A, 4B:
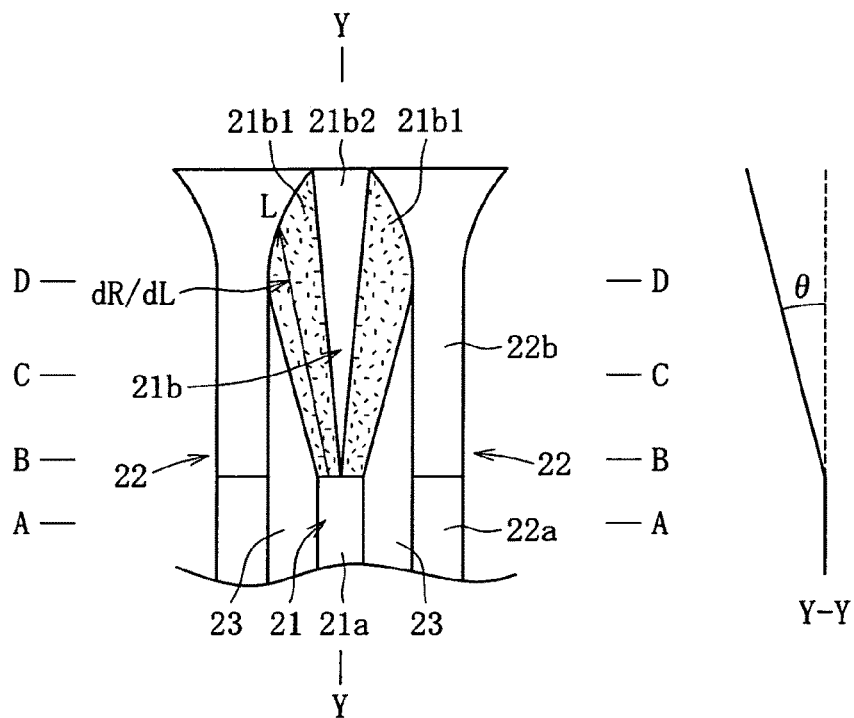

FIGS. 4a and 4b where FIG. 4(a) is a plan view of the axially opposite end side portion of the male spline section, and FIG. 4(b) is a sectional view taken along the line Y-Y of FIG. 4(a).

Figure 5A:
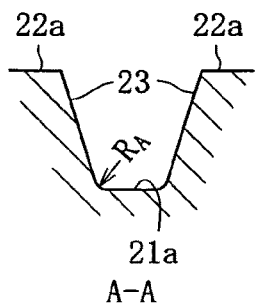
Figure 5B:
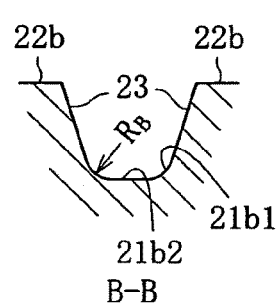
Figure 5C:
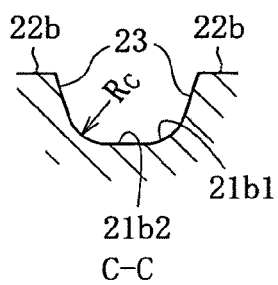
Figure 5D:
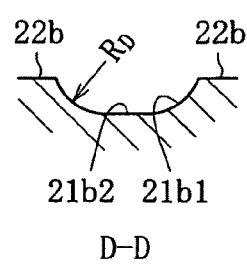

FIGS. 5a-5d where FIG. 5(a) is a sectional view taken along the line A-A of FIG. 4(a), FIG. 5(b) is a sectional view taken along the line B-B of the same, FIG. 5(c) is a sectional view taken along the line C-C of the same, and FIG. 5(d) is a sectional view taken along the line D-D of the same.

Figure 6:
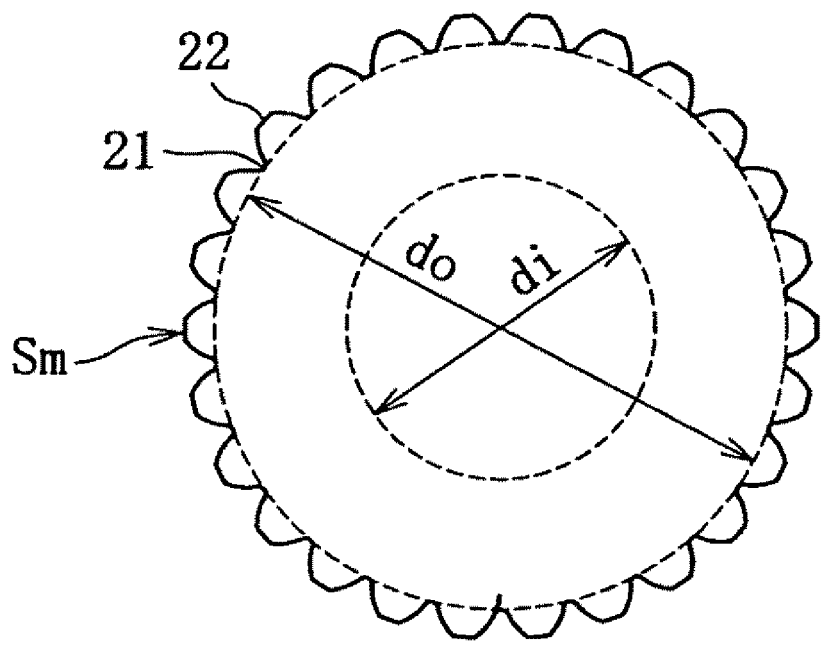

FIG. 6 is a circumferential sectional view of the male spline section.

Figure 7:
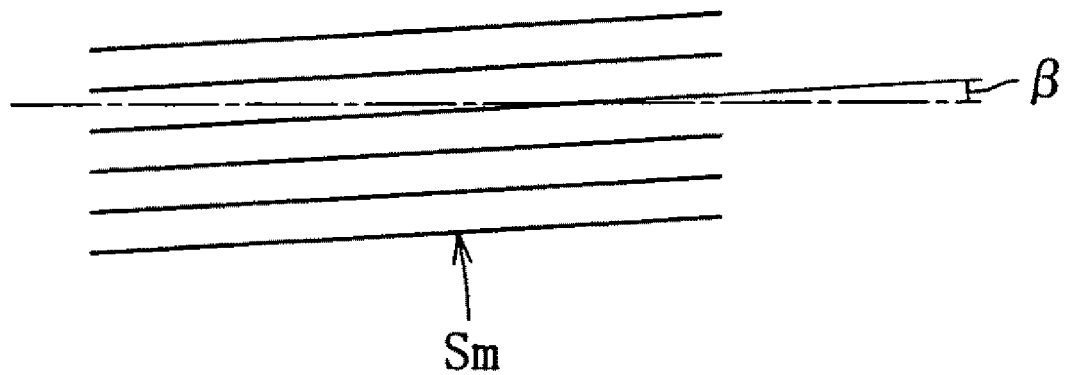

FIG. 7 is a plan view schematically illustrating the construction of a male spline section having a torsional angle.

Figures 8, 9:
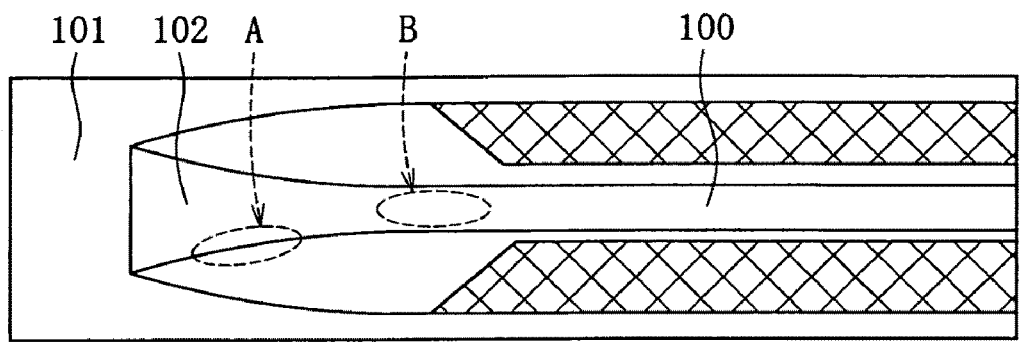

FIG. 8 is a plan view of a male spline section.

FIG. 9 is a table illustrating the chemical composition of a specimen used in a fatigue test.

FIG. 10a is a side view of a specimen for a rotational bending fatigue test.

FIG. 10b is an enlarged side view of a notch portion A of the specimen.

FIG. 10c is a table illustrating the relationship between the dimension of the notch portion and stress concentration coefficient.

FIG. 11a is a side view of a specimen for a torsional fatigue test.

FIG. 11b is an enlarged side view of a notch portion A of the specimen.

FIG. 11c is a table illustrating the relationship between the dimension of the notch portion and stress concentration coefficient.

Figure 12:
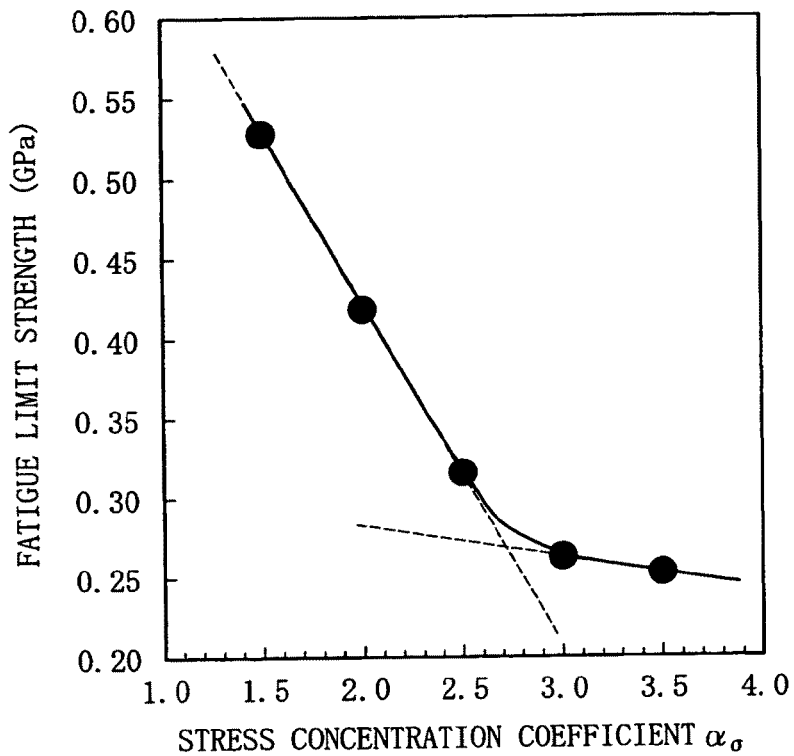

FIG. 12 is a chart illustrating the results of measurement of fatigue limit obtained in the rotational bending fatigue test.

Figure 13:
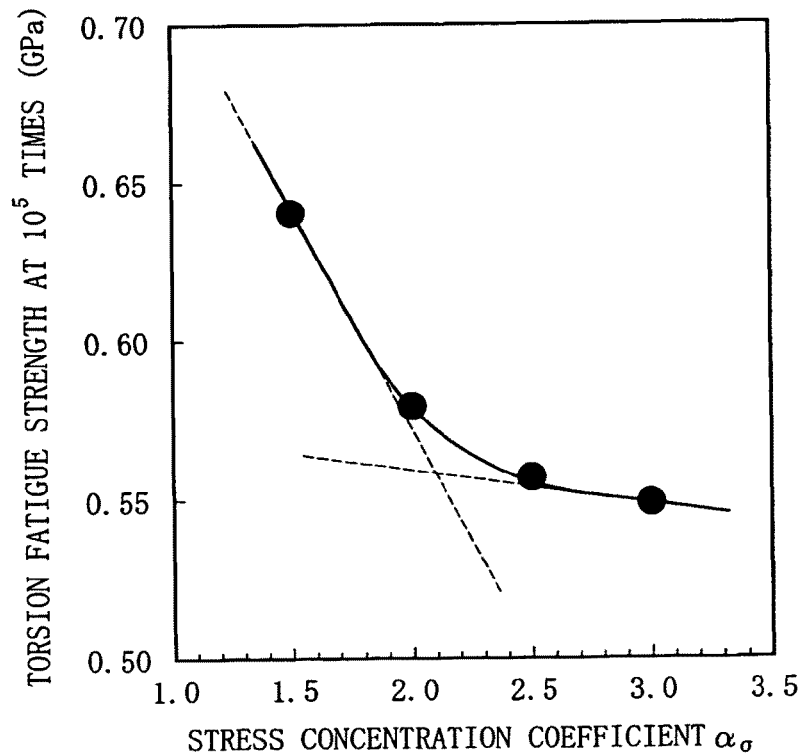

FIG. 13 is a chart illustrating the results of measurement of torsional fatigue strength at $10^5$ times as obtained in the torsional fatigue test.

Figure 14:
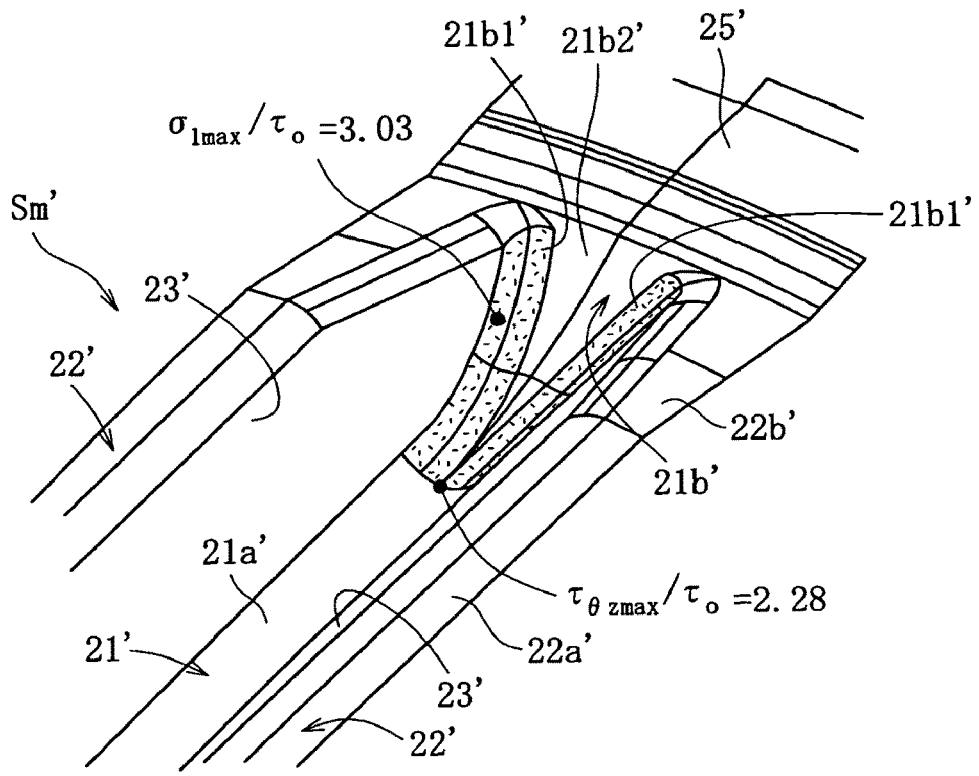

FIG. 14 is a perspective view of the axially opposite end side portion of a conventional male spline section.

Figure 15:
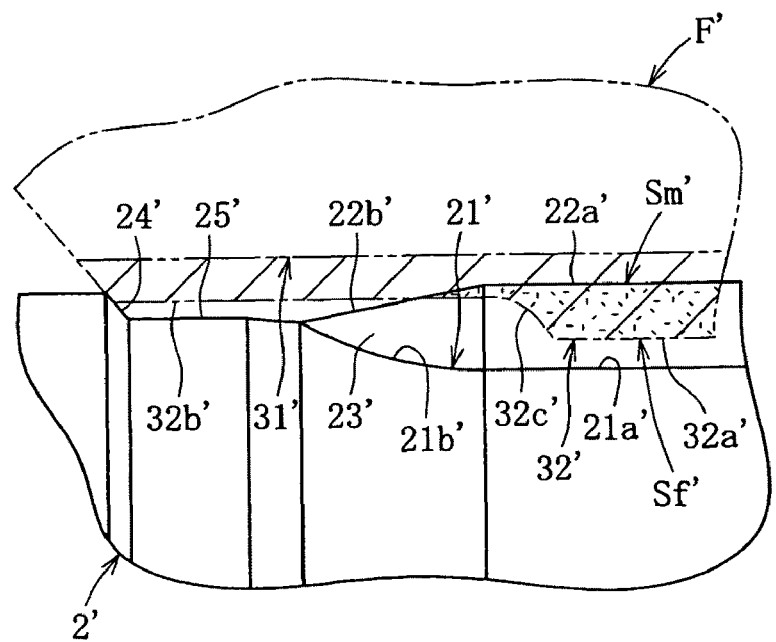

FIG. 15 is a sectional view of the axially opposite end side portion of the conventional male spline section.

FIG. 16 is a plan view of the axially opposite end side portion of the conventional male spline section.

FIG. 17a is a side view of a specimen.

FIG. 17b is a table illustrating the specifications of an involute spline serving as a specimen.

Figure 18:
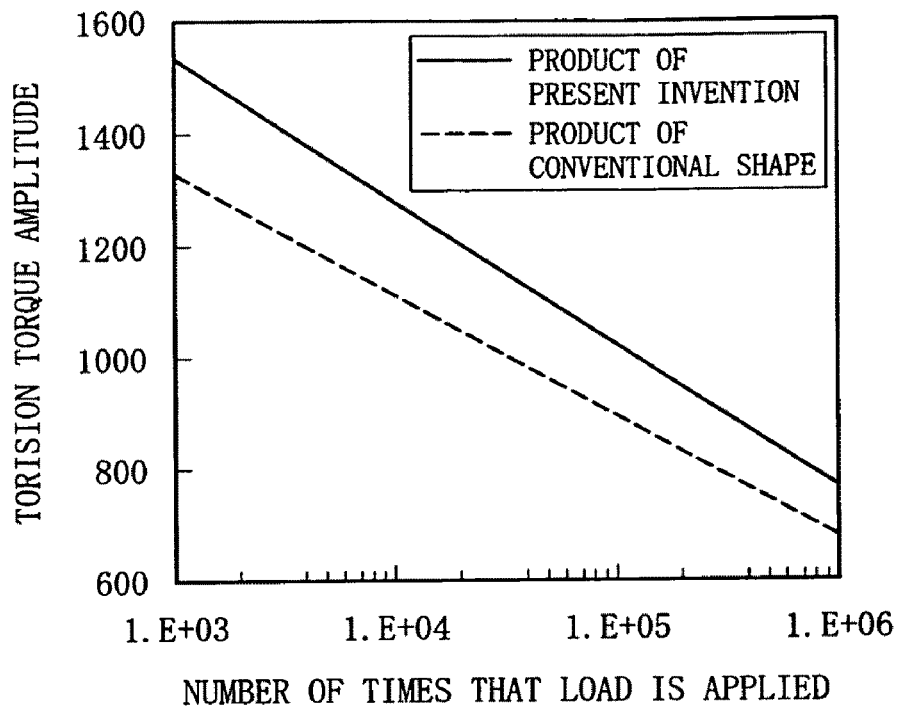

FIG. 18 is a T/N chart obtained from a reversed torsional fatigue test.

Figure 19:
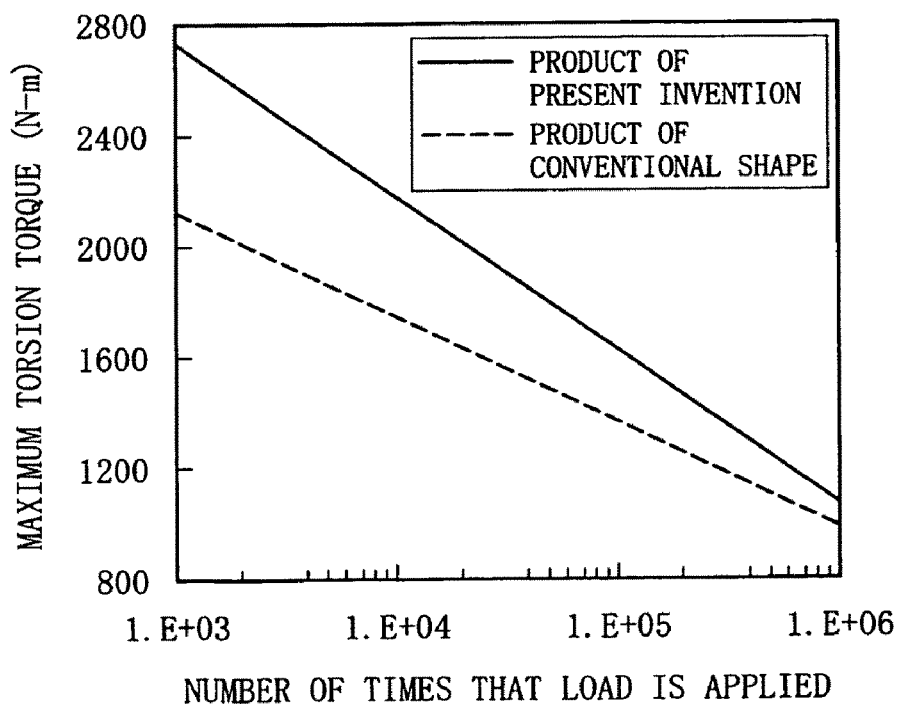

FIG. 19 is a T/N chart obtained from a pulsating torsional fatigue test.

Figure 20:
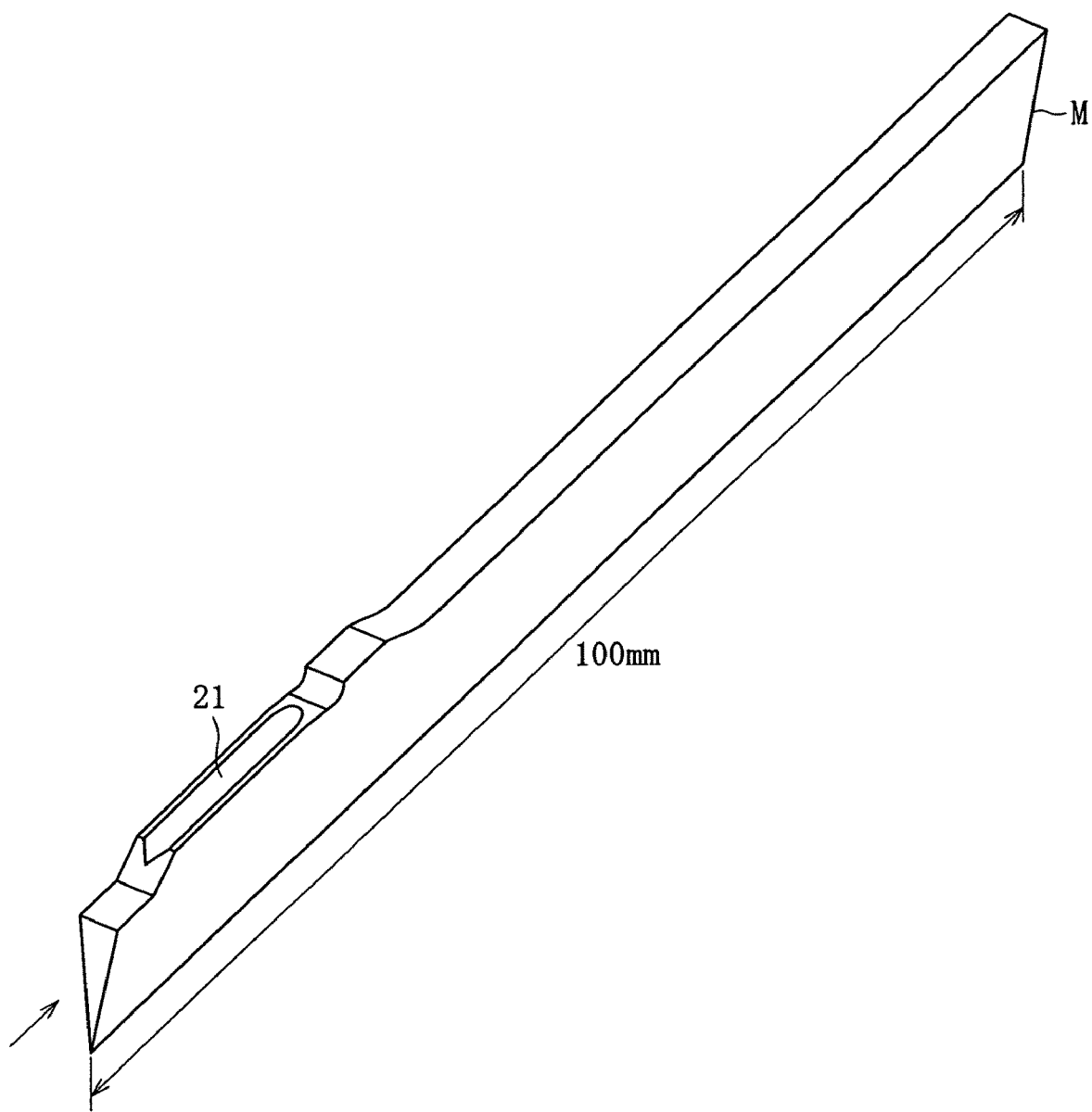

FIG. 20 is a perspective view of an FEM analysis model.

Figure 21:
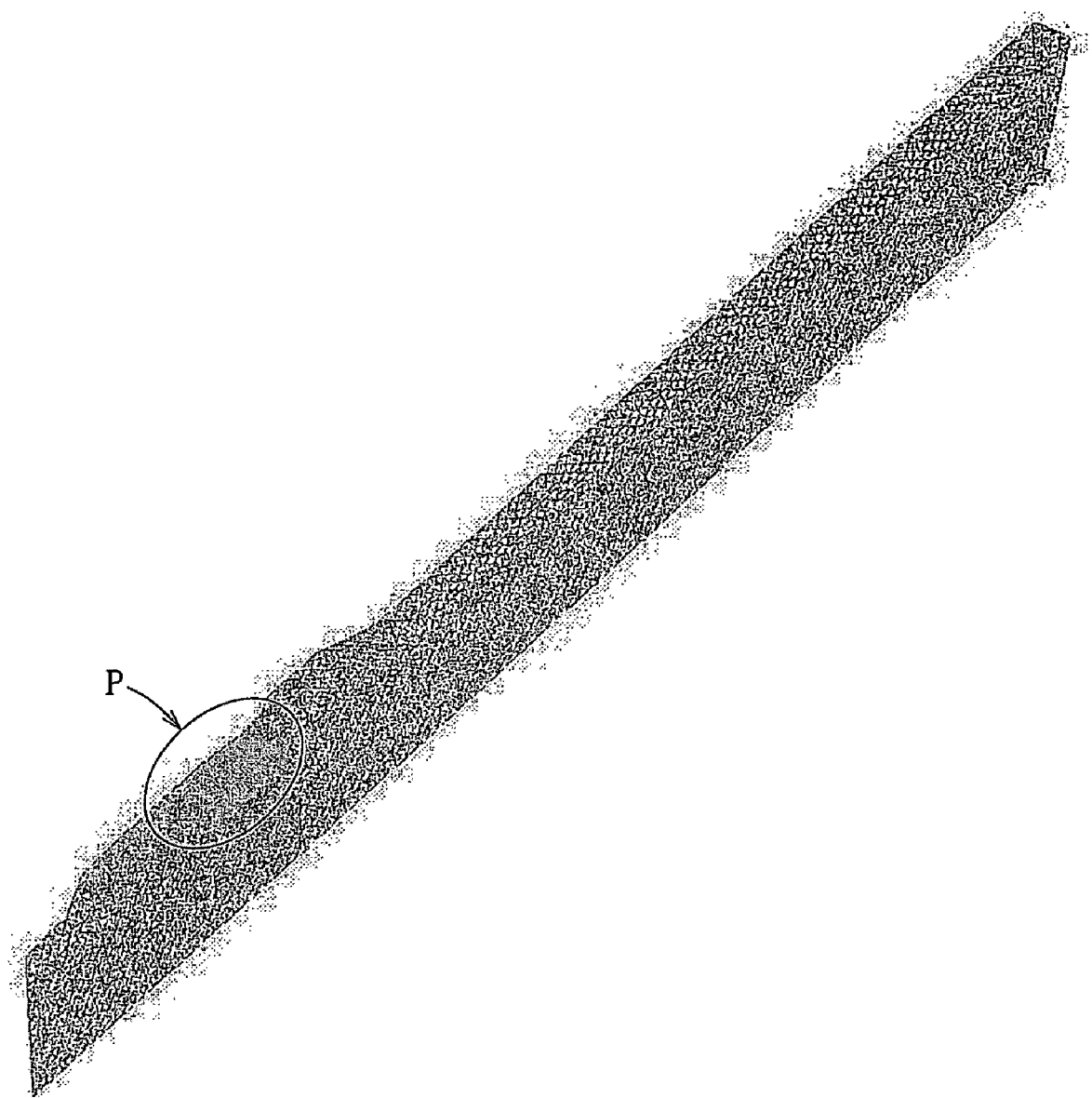

FIG. 21 is a perspective view of an analysis model with a mesh.

Figure 22B:
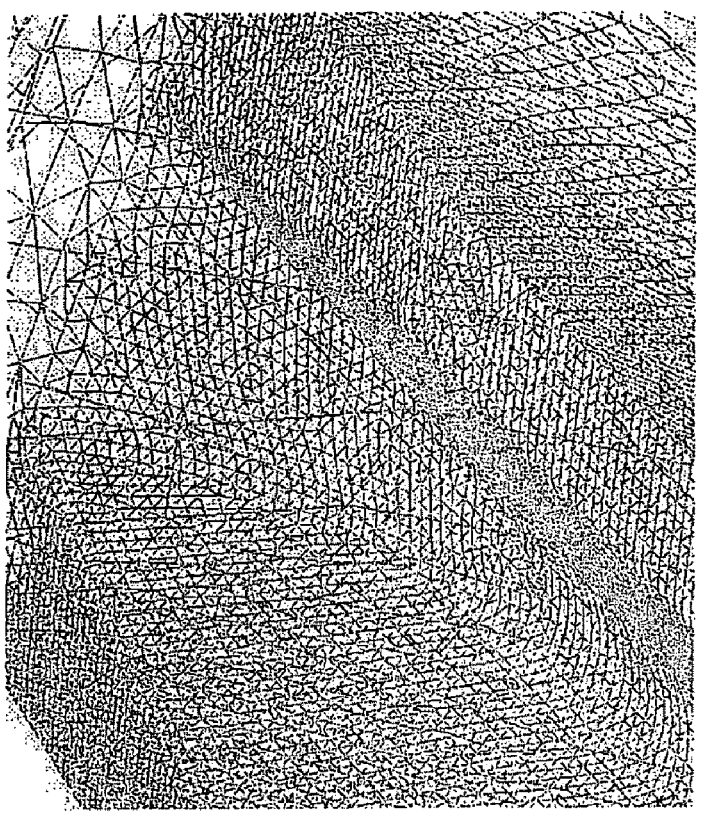
Figure 22A:
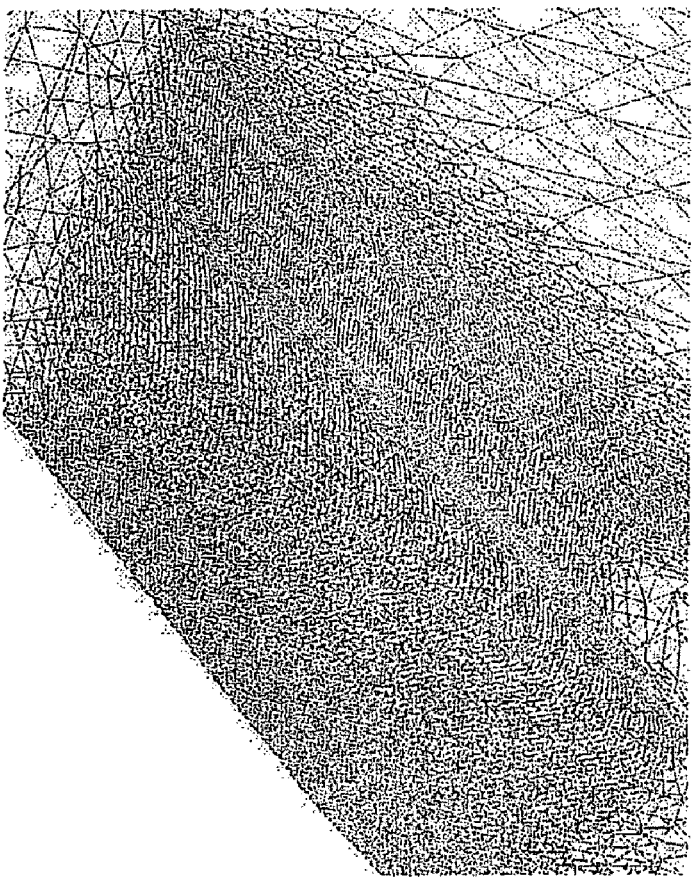

FIGS. 22a and 22b where FIG. 22(a) is a perspective view of a principal portion P of a product according to the present invention provided with a mesh, and FIG. 22(b) is a perspective view of a principal portion P of a conventional product provided with a mesh.

Figure 23:
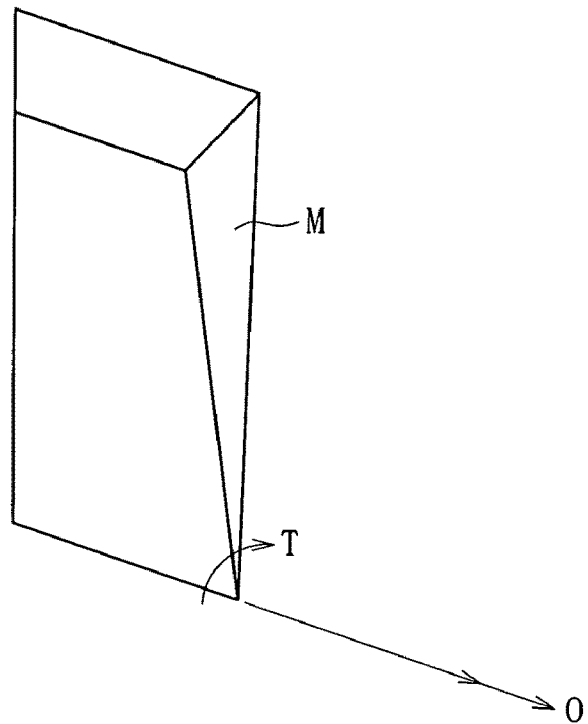

FIG. 23 is a perspective view of an end portion on the axially opposite end side of an analysis model.

Figure 24:
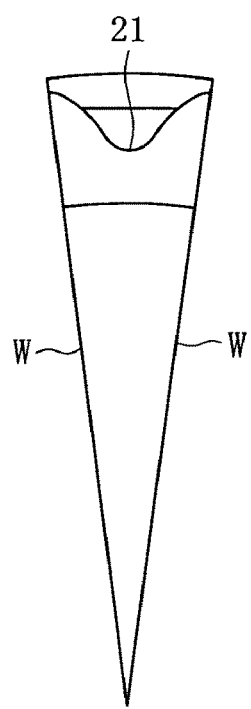

FIG. 24 is a front view of the analysis model as seen in the direction of the arrow in FIG. 20.

Figure 25:
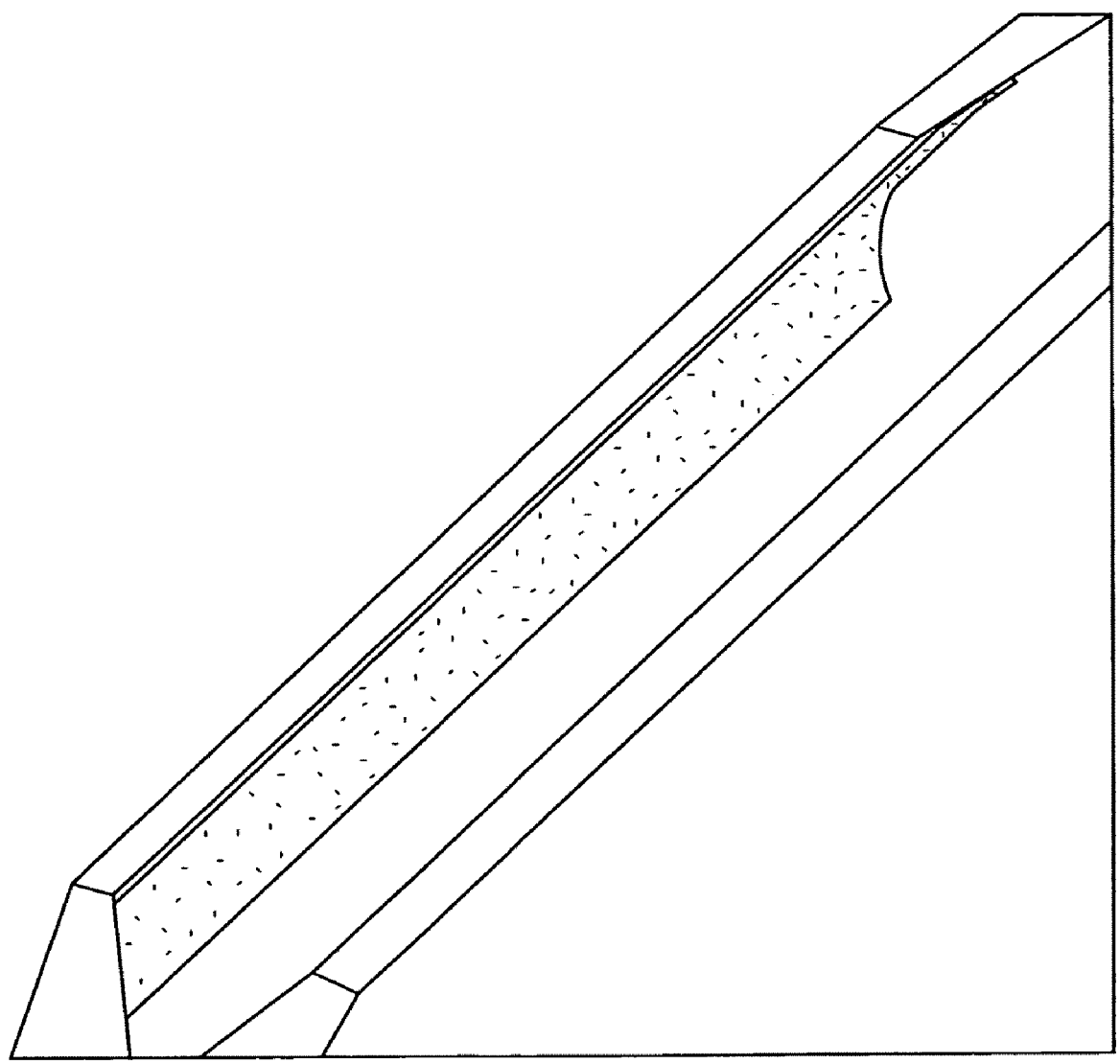

FIG. 25 is a perspective view of an analysis model.

Figures 26A, 26B:
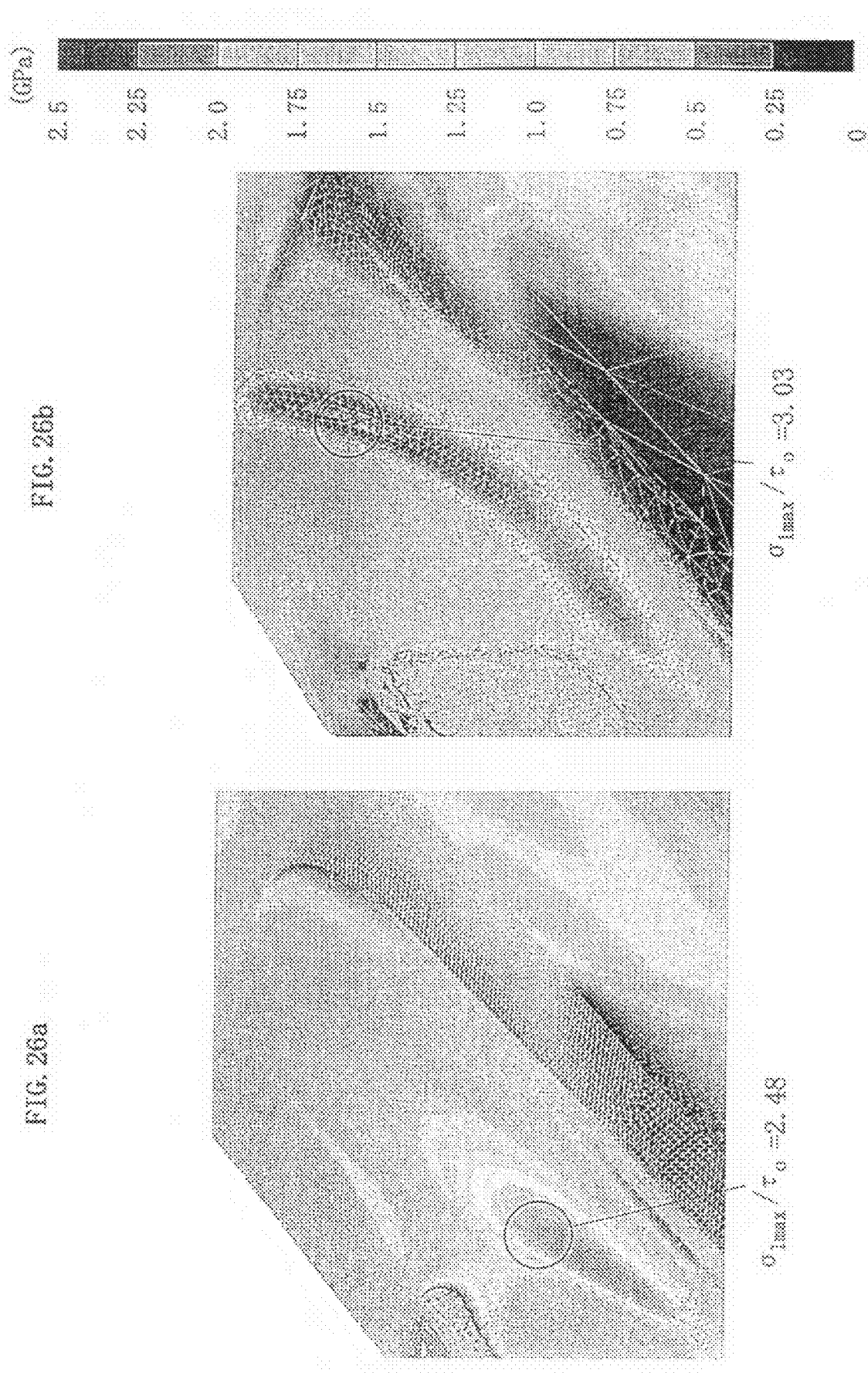

FIGS. 26a and 26b are diagrams illustrating principal stress analysis results.

Figure 27B:
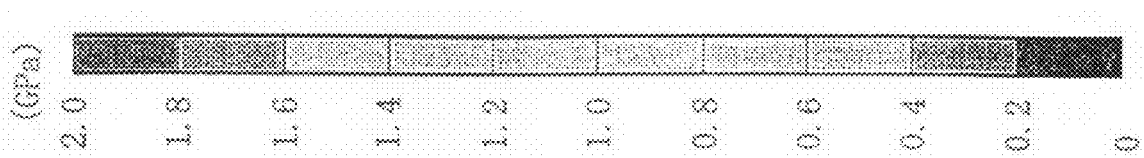
Figure 27B:
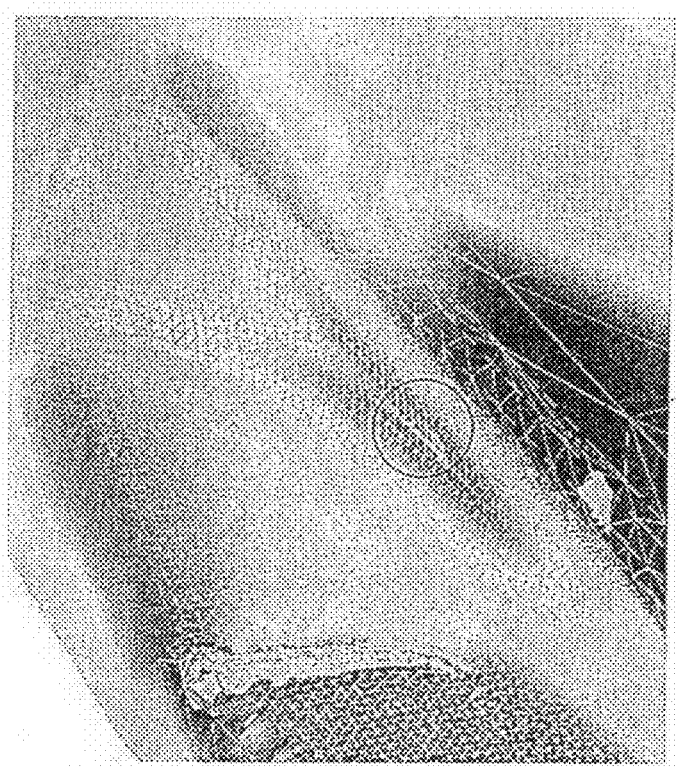
Figure 27A:
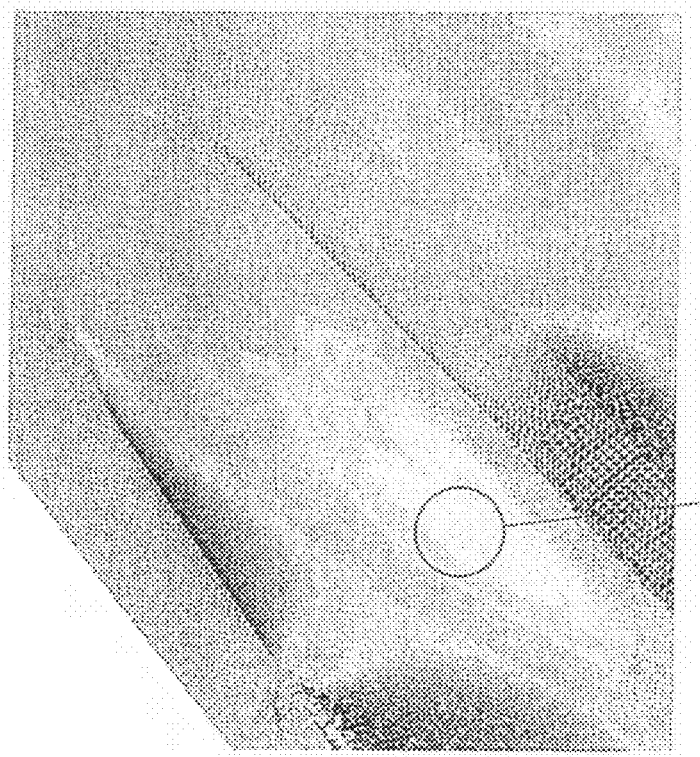

FIGS. 27a and 27b are diagrams illustrating axial shear stress analysis results.

Figure 28:
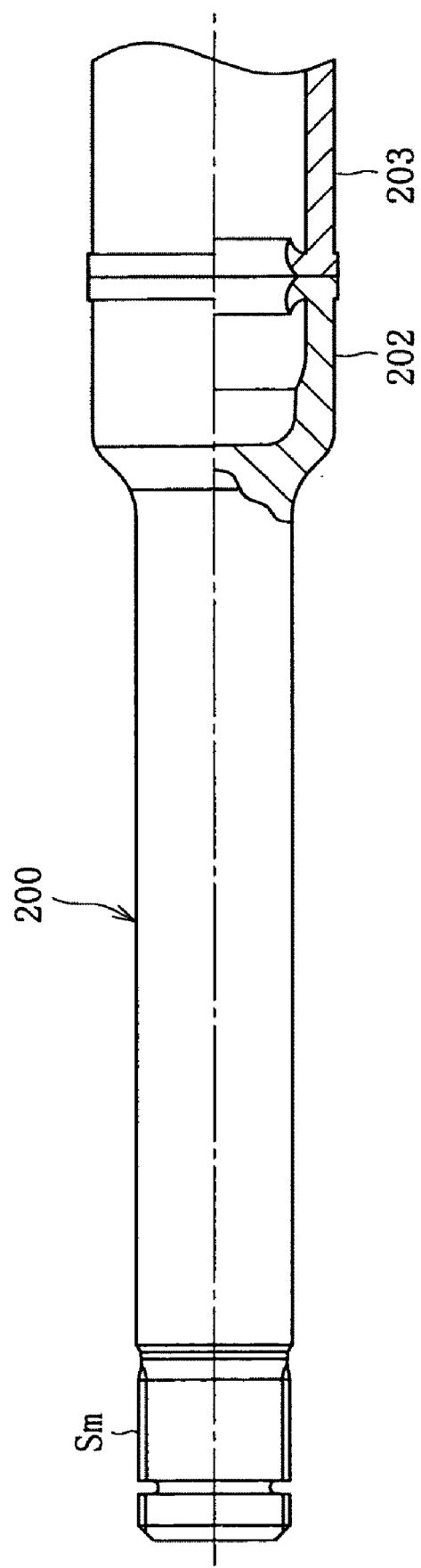

FIG. 28 is a sectional view of a stab shaft.

Figure 29:
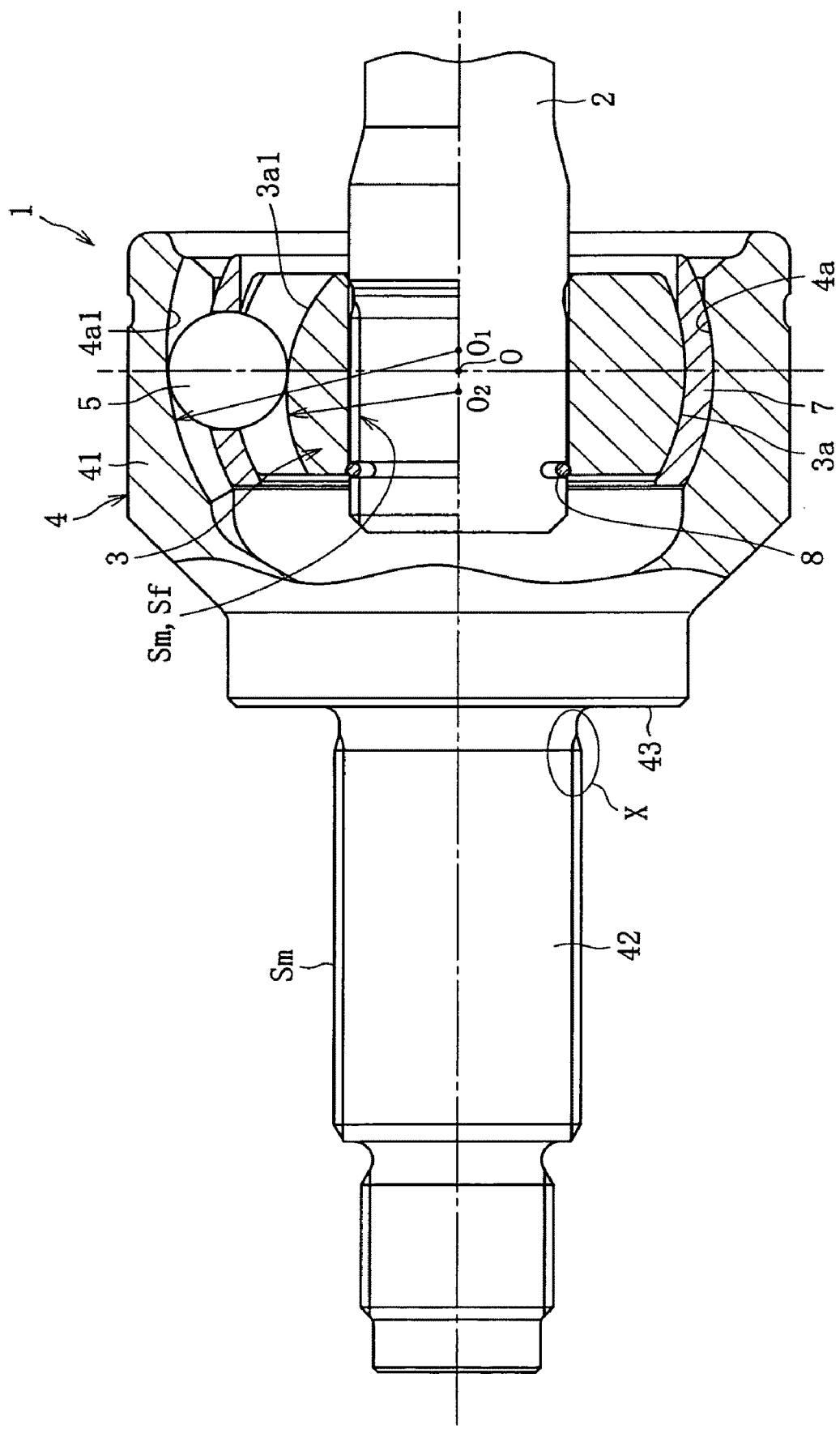

FIG. 29 is a sectional view of a fixed type constant velocity universal joint.

Figure 30:
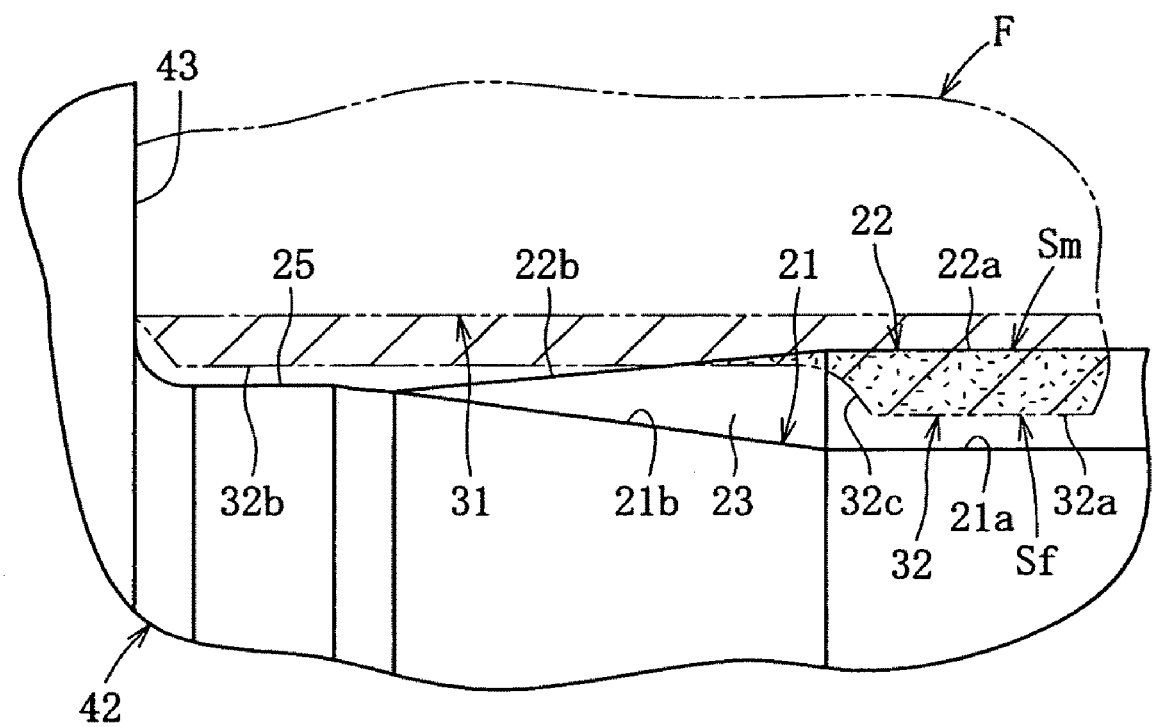

FIG. 30 is an enlarged sectional view of portion X of FIG. 29.

Figure 31:
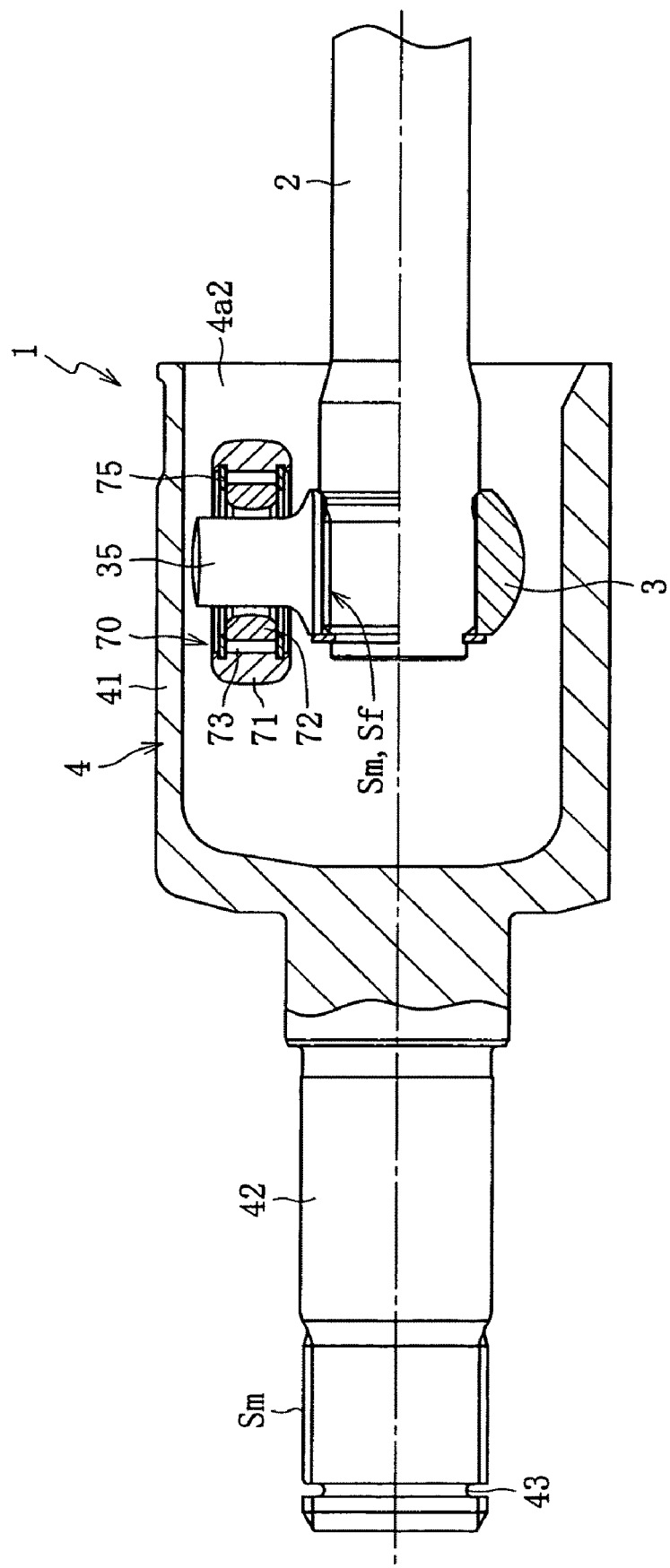

FIG. 31 is a sectional view of a plunging type constant velocity universal joint.

Figure 32:
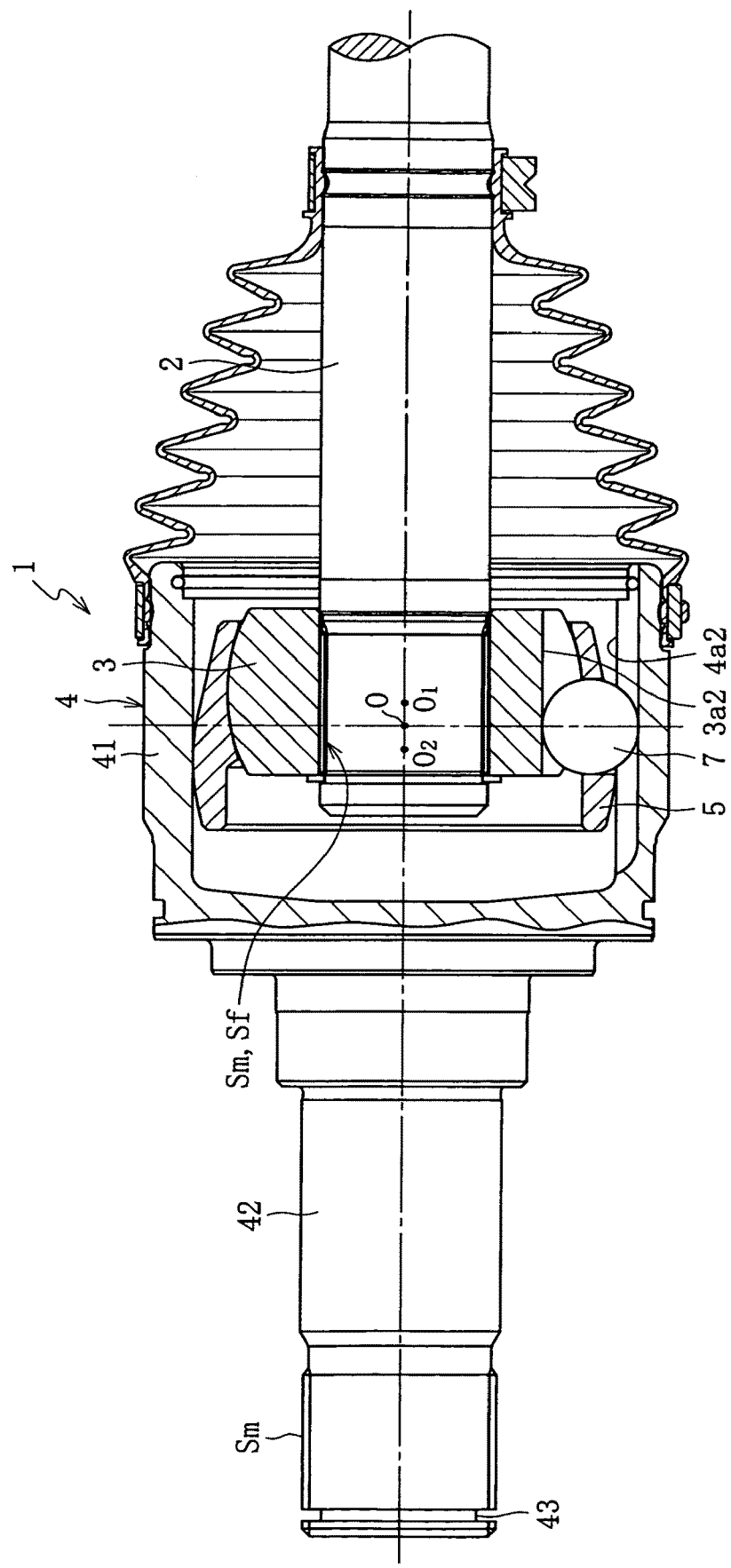

FIG. 32 is a sectional view of another example of a plunging type constant velocity universal joint.

Figure 33:
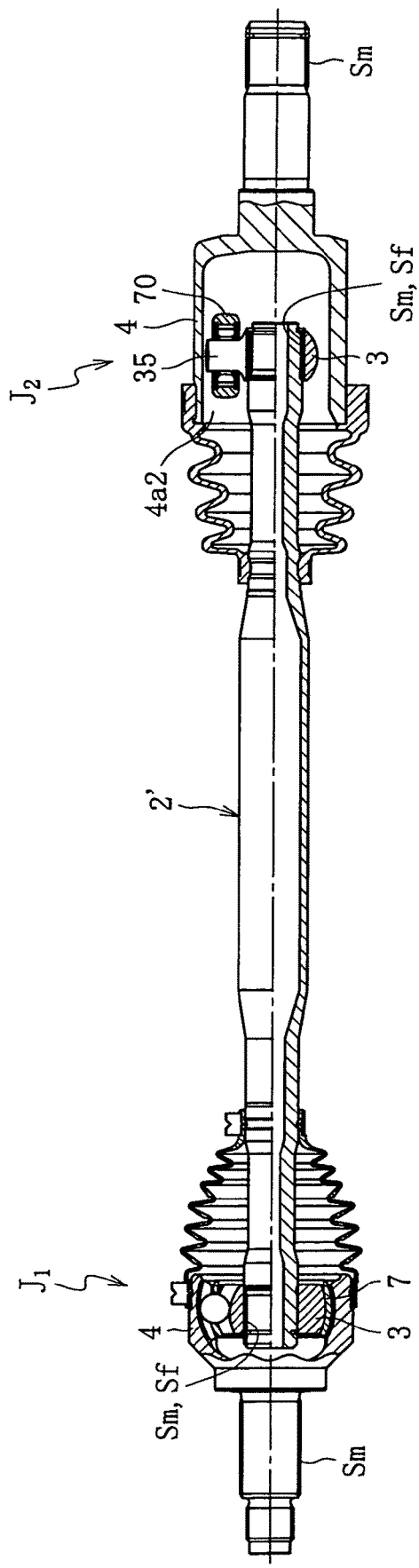

FIG. 33 is a sectional view of a drive shaft.

DESCRIPTION OF SYMBOLS 1 constant velocity universal joint
2 power transmission shaft
3 inner joint member
3a1 track groove
3a2 track groove
4 outer joint member
4a1 track groove
4a2 track groove
5 torque transmission ball
7 cage
21 valley section
21a straight section
21b diameter-expanded section
21b1 rounded section
21b2 flat section
22 crest section
23 tooth surface
24 shoulder portion
25 smooth portion 35 leg shaft
41 mouth portion
42 stem portion
70 roller cassette
Sm male spline section
Sf female spline section

DETAILED DESCRIPTION OF THE INVENTION

In the following, an embodiment of the present invention is described with reference to the accompanying drawings.

Figure 1:
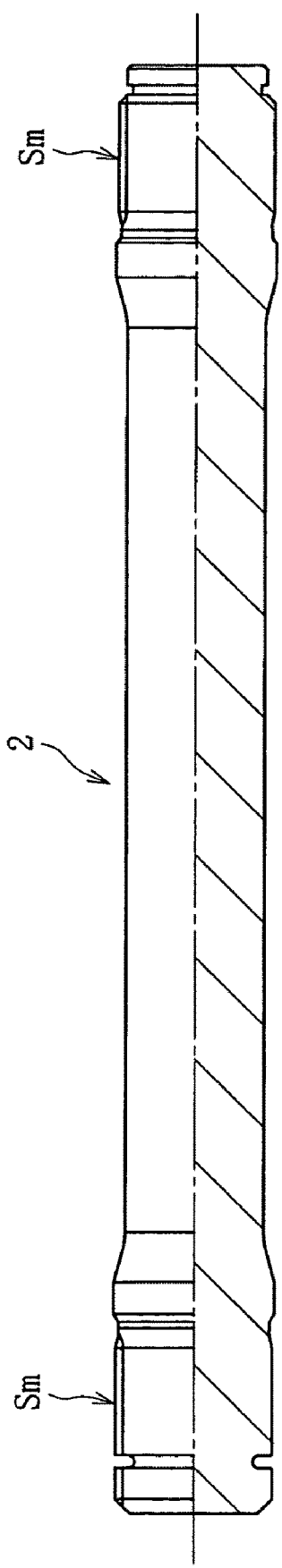
FIG. 1 is a sectional view of a power transmission shaft having a male spline section.

FIG. 1 is a partial sectional view of a power transmission shaft 2 serving as a male member. The power transmission shaft 2 illustrated in the drawing is solid, and is made of a medium carbon steel of a carbon amount of approximately 0.30 to 0.60 wt %. When the carbon amount is less than 0.30 wt %, stable high hardness cannot be attained even if induction hardening is treated. When the carbon amount exceeds 0.60 wt %, the material hardness increases, resulting in marked deterioration in workability for rolling or the like. In particular, in the case of a stab shaft (see FIG. 28) having a welded portion or a friction pressure welded portion, it is desirable for the S amount in the steel to be within the range of 0.002 to 0.008 wt %. The reason for setting the upper limit value of the S amount to 0.008 wt % is to maintain satisfactory weldability and friction pressure welding property. The reason for setting the lower limit value to 0.002 wt % is that it is difficult to set it to a level lower than that and that there is little meaning in doing so.

Figure 3:
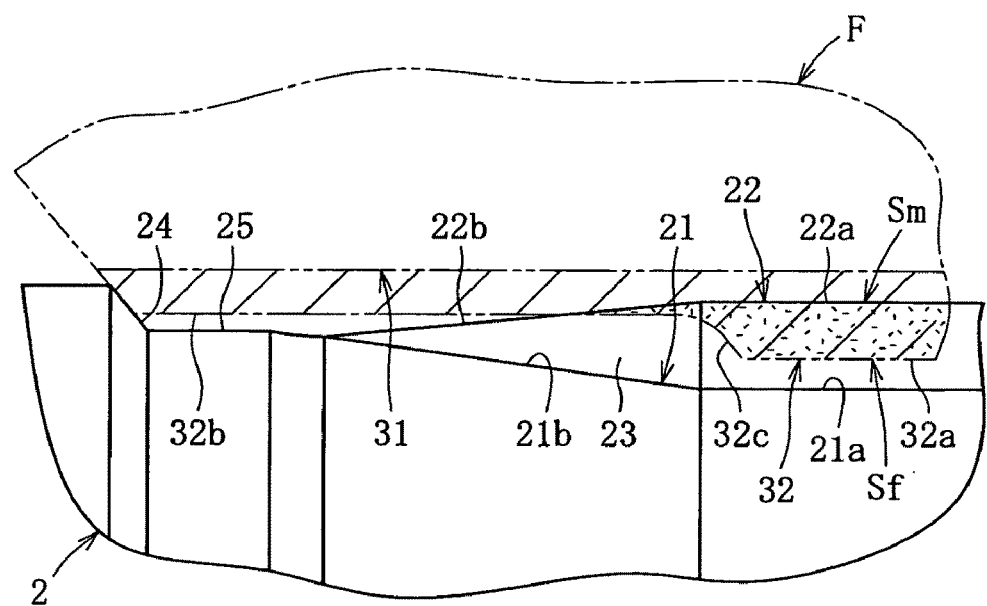
FIG. 3 is an enlarged sectional view of portion X of FIG. 29.

A male spline section Sm is formed in the outer periphery of the axial ends of the power transmission shaft 2. By fit-engaging one of the male spline sections Sm with a female spline section Sf formed in the inner periphery of a female member F as illustrated in FIG. 3, the power transmission shaft 2 and the female member F are connected together so as to allow torque transmission. The inner end portion at the end on the side opposite to the axial end (left-hand side in FIG. 3) of the female member F is held in contact with a shoulder portion 24 in the outer periphery of the power transmission shaft 2, and the inner end portion of the axial end side (right-hand side in FIG. 3) is locked, for example, by a snap ring 8 (see FIG. 29), whereby the female member F is fixed in position in the axial direction with respect to the power transmission shaft 2.

Figure 2:
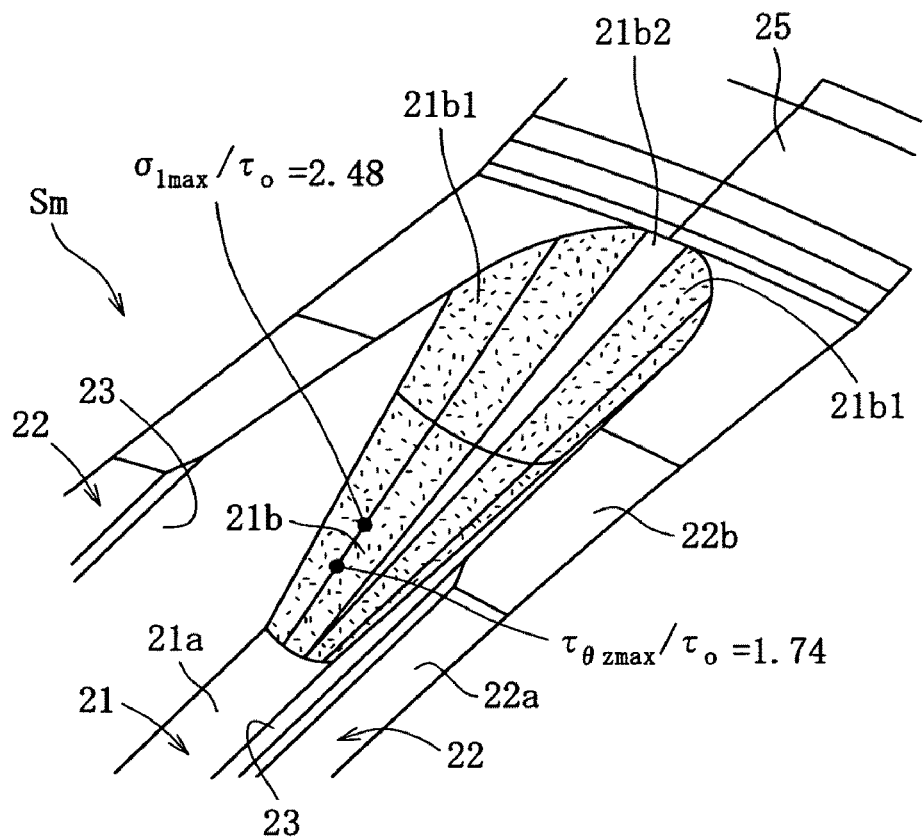
FIG. 2 is a perspective view of an axially opposite end side portion (portion X in FIG. 29) of the male spline section.

As illustrated in FIGS. 2, 3, and 6, the male spline section Sm of the power transmission shaft 2 has axially extending valley sections 21 and crest sections 22 alternately in the circumferential direction. The male spline section Sm of this embodiment is of a so-called round up type formed by rolling, each valley section 21 includes a straight portion 21a of the same dimension in the axial direction and a diameter-expanded section 21b formed at the axially opposite end thereof. Similarly, each crest section 22 includes a straight portion 22a of the same dimension in the axial direction, and a diameter-reduced section 22b formed at the axially opposite end thereof. As illustrated in FIG. 4, the start ends of the diameter-expanded section 21b and the diameter-reduced section 22b are at the same position in the axial direction, and the terminal end thereof are also at the same position in the axial direction. It is also possible to form the male spline section Sm by cold forging. In this case, the diameter-reduced sections 22b of the crest sections 22 are not formed, and the axially opposite end side of the crest sections 22 as a whole is of the same outer diameter dimension. Heat treatment such as induction hardening is treated on the male spline section Sm after the formation. Further, shot peening is treated thereon as needed.

As illustrated in FIG. 3, the valley section 31, which is formed in an inner periphery of the female member F, of the female spline section Sf is formed to extend in the same diameter dimension to the end on the axially opposite side. On the other hand, the crest section 32 has a small diameter portion 32a, a large diameter portion 32b, and a rising portion 32c between the small diameter portion 32a and the large diameter portion 32b. The inner diameter dimension of the large diameter portion 32b is smaller than the outer diameter dimension of the crest section 22 of the male spline section Sm (outer diameter dimension of the straight portion 22a), and larger than the outer diameter dimension of a smooth portion 25 of the power transmission shaft 2 formed on the axially opposite end side of the male spline section Sm.

When the male spline section Sm and the female spline section Sf are fit-engaged with each other, the tooth surface 23 of the male spline section Sm and the tooth surface (not shown) of the female spline section Sf are brought into firm press contact with each other. As illustrated in FIG. 3, the fit-engagement portion between the two tooth surfaces at this time (indicated by the dotted pattern) extends also to the outer side region of the diameter-expanded section 21b.

While FIG. 3 illustrates the case in which the axial sections of the diameter-expanded section 21b and the diameter-reduced section 22b are both formed in a straight tapered configuration, it is also possible to form the axial sections of both in a curved configuration. It is also possible to combine straight and curved configurations.

As illustrated in FIG. 2, in the present invention, the diameter-expanded section 21b of the male spline section Sm includes rounded sections 21b1 (indicated by the dotted pattern) formed on both circumferential sides thereof and a flat section 21b2 formed between the rounded sections 21b1. The rounded sections 21b1 have an arcuate radial sectional configuration, and both circumferential sides thereof are smoothly connected to the tooth surface 23 and the flat section 21b2.

FIG. 4a is a plan view illustrating the portion around the diameter-expanded section 21b of the male spline Sm, and FIGS. 5a through 5d are sectional views taken along the lines A-A, B-B, C-C, and D-D. As illustrated in FIG. 5a, the radius of curvature $R_A$ of the rounded section connecting the straight section 21a of the valley section 21 and the tooth surface 23 is fixed up to the boundary portion leading to the diameter-expanded section 21b. As illustrated in FIGS. 5b through 5d, in the diameter-expanded section 21b, the radius of curvature of the rounded sections 21b1 is larger than the radius of curvature $R_A$ of the boundary portion, and increases gradually toward the axially opposite end side ($R_A<R_B<R_C<R_D$). Further, as illustrated in FIG. 4a, up to the positions where the boundary lines of the rounded sections 21b1 cross the ridges of the crest sections and where the tooth surface 23 ceases to exist, the circumferential width dimension of the rounded sections 21b1 gradually increases toward the axially opposite end side (upwards as seen in the drawing). After the increase, the width dimension is gradually reduced. The circumferential width dimension of the flat section 21b2 also increases gradually toward the axially opposite end side.

In FIG. 4a, symbol L indicates a coordinate in the direction of a line passing the center of the radius of curvature of each rounded section 21b1 of the diameter-expanded section 21b. The increase ratio of the radius of curvature of the rounded section 21b1 is expressed by the formula dR/dL. In this embodiment, dR/dL is set to 0.18. In FIG. 4b, symbol θ indicates the inclination angle of a straight line connecting the small diameter end and the large diameter end of the axial section of the diameter-expanded section 21b. In this embodiment, the angle θ is set to 8.3°.

FIGS. 14 through 16 illustrate the male spline section Sm' as disclosed in Patent Document 1 (JP 2005-147367 A), that is, the male spline section Sm' in which the rounded sections 21b1' are formed at the boundaries between the diameter-expanded section 21b' and the tooth surface 23' and in which the radius of curvature of the rounded sections 21b1' is fixed over the entire axial length (In FIGS. 14 through 16, the portions corresponding to those illustrated in FIGS. 2 through 4 are indicated by the same reference numerals with (') affixed thereto).

FEM analysis was conducted on the male spline section Sm (according to the present invention) illustrated in FIG. 2 and the male spline section Sm' (according to the prior art) illustrated in FIG. 14. For each of those, there were obtained the maximum value $\sigma_{1max}$ of the maximum principal stress and the maximum value of the shear stress, and values were obtained by dividing those by the above-mentioned reference stress $\tau_0$. In a solid shaft as in the case of this embodiment, $\tau_0$ can be obtained by setting $d_i$ to 0 in the above-mentioned formula (1).

This FEM analysis is a three-dimensional linear elastic analysis, and "I-deas Ver. 10" was used as the analysis software. As illustrated in FIG. 20, the analysis model is a linear elastic body including one valley section 21, 21' of the male spline section Sm, Sm', and the model length is 100 mm. FIG. 21 illustrates a mesh added to this analysis model. Each element is a tetrahedral secondary element. The total number of elements is approximately 200,000, and the total number of contacts is approximately 300,000. The element length is 0.2 mm or less (the minimum element length is 0.05 mm) in the principal portion P (portion including the male spline section Sm, Sm'), and is 0.5 mm in the portion other than the principal portion P. FIGS. 22a and 22b are enlarged views of the meshes of the principal portion P, FIG. 22a illustrates a product according to the present invention corresponding to FIG. 2, and FIG. 22b illustrates a product according to the prior art corresponding to FIG. 14. As illustrated in FIG. 23, a rigid element was prepared at the axially opposite end side end surface M of the analysis model, and torque T was loaded on the central axis O of the end surface M. However, since the model used is a 1/tooth-number model, the loaded torque is 1/tooth-number of the actual torque. As illustrated in FIG. 24, the analysis model is of a configuration in axial symmetry with respect to a radial axis passing the center of the valley section 21, with all the contacts of both side surfaces W in the circumferential direction being in periodical symmetry. As illustrated in FIG. 25, in the surface of the analysis model to be brought into contact with the mating member (indicated by the dotted pattern), displacement in the direction of the normal thereof is constrained.

FIGS. 26a and 26b illustrate the analysis result of the maximum principal stress $\sigma_1$, and FIGS. 27a and 27b illustrate the analysis result of the axial shear stress $\tau_{\theta z}$. In both FIGS. 26a and b and 27a and b, FIGS. 26a and 27a illustrate a model according to the present invention, FIGS. 26b and 27b illustrate a model according to the prior art. From those analysis results, it was found out that in the model of the prior art, $\sigma_{1max}/\tau_0=3.03$, whereas, in the model of the present invention, $\sigma_{1max}/\tau_0=2.48$, thus indicating an improvement in the stress concentration mitigating effect with respect to tensile stress over the prior art. It is to be assumed that this is due to the fact that, in the present invention, the radius of curvature of the rounded sections 21b1 in the vicinity of the terminal end of the tooth surface 23 is larger than the radius of curvature of the corresponding portion in the prior art. As described above, when the stress concentration coefficient $\alpha_\sigma$ with respect to tensile stress is 2.7 or less, the stress concentration mitigating effect is conspicuous, and hence, in the present invention, in which $\sigma_{1max}/\tau_0 \leq 2.7$, it is possible to attain a substantial increase in fatigue strength with respect to tensile stress as compared with the prior art.

Further, in the prior art, $\tau_{\theta zmax}/\sigma_0=2.28$, whereas, in the present invention, $\sigma_{\theta zmax}/\tau_0=1.74$, which indicates an improvement in terms of the stress concentration mitigating effect with respect to axial shear stress over the prior art. As described above, when the stress concentration coefficient $\alpha_\tau$ is 2.1 or less, the stress concentration mitigating effect is conspicuous, and hence the present invention, in which $\tau_{\theta zmax}/\tau_0 \leq 2.1$, helps to achieve a substantial improvement in terms of fatigue strength with respect to shear stress over the prior art. In this way, in the present invention, it is possible to attain with the male spline section Sm a high stress concentration mitigating effect with respect to both tensile stress and shear stress. Thus, it is possible to enhance the fatigue strength of the power transmission shaft 2.

From further analysis by the inventors of the present invention, it was found out that when the increase ratio dR/dL of the radius of curvature of the rounded section 21b1 illustrated in FIG. 4 is in the range: $0.05 \leq dR/dL \leq 0.60$, and the inclination angle θ of the diameter-expanded section 21b is in the range: $5° \leq \theta \leq 20°$, it is possible to satisfy the relationship: $\sigma_{1max}/\sigma_0 \leq 2.7$, and $\tau_{\theta zmax}/\tau_0 \leq 2.1$.

Further, as illustrated in FIG. 14, in the prior art, the maximum shear stress $\tau_{\theta zmax}$ is generated in the starting point center line of each diameter-expanded section 21b'. In this way, when the maximum shear stress is generated in the center line, the maximum shear stress is generated in the same portion in both the normal and reverse rotation when the power transmission shaft 2 transmits torque in both the normal and reverse directions, and hence fatigue fracture progresses so much the easier. In contrast, in the present invention, as illustrated in FIG. 2, the maximum shear stress $\tau_{\theta zmax}$ is generated in both rounded sections 21b1, which are on the axially opposite end side of the starting point of the diameter-expanded section 21b. Thus, between normal rotation and reverse rotation, there is a difference in the position where the maximum shear stress is generated. Thus, it is possible to suppress the rate at which fatigue fracture progresses. Thus, the present invention is especially suitable for uses in which the torque transmitting direction is frequently switched, for example, uses in which the torque transmitting direction is reversed according as a vehicle advances or retreats.

The above-mentioned diameter-expanded section having the rounded sections 21b1 can be formed simultaneously with the teeth of the male spline section Sm by forming, in a rolling rack used in component rolling, a formed portion of a configuration corresponding to the diameter-expanded section 21b. Also in the case in which the male spline section is formed by cold forging through press working, a formed portion corresponding to the configuration of the diameter-expanded section 21b is previously formed on the press working die, whereby it is possible to form the rounded sections 21b1 simultaneously with the teeth of the male spline section Sm.

FIG. 7 illustrates another embodiment of the present invention. In this embodiment, the teeth of one of the male spline section Sm or the female spline section Sf (male spline section Sm in the case of the illustrated example) has a torsional angle β with respect to the axial direction, which is effective in eliminating backlash between the spline sections Sm and Sf after the fit-engagement. When the torsional angle β is provided, the inter-tooth-surface contact pressure on the torque transmission side increases, and, with that, the tensile stress and shear stress concentrated on the diameter-expanded section also increase, resulting in deterioration in fatigue strength. From this viewpoint, the torsional angle β has been substantially limited to 15' in the prior art. In contrast, in the present invention, it is possible to substantially enhance the fatigue strength of the power transmission spline as described above, and hence it is possible for the torsional angle β to be 15' or more, thus making it possible to obtain a high backlash-eliminating effect.

While in the embodiment described above there is adopted a so-called "spear-shaped type" male spline section Sm, in which the circumferential width of the diameter-expanded section 21b is gradually increased on the axially opposite end side, this should not be construed restrictively. The present invention is also applicable to a so-called "boat-shaped type" male spline section Sm in which the circumferential width of the diameter-expanded section 21b is fixed. In this case also, rounded sections are provided on both sides in the circumferential direction of the diameter-expanded section 21b, and the radius of curvature of the rounded sections is gradually increased toward the axially opposite end side, whereby it is possible to obtain the same effect as that of the present invention.

The present invention is also applicable to a case in which a so-called stab shaft (pressure welded stab shaft or a welded stab shaft) is used as the power transmission shaft. As illustrated in FIG. 28, a stab shaft 200 has at one end thereof a male spline section Sm for connection to the inner joint member of a constant velocity universal joint or the like, and, at the other end, a flange portion 202 for the pressure welding or welding of a steel pipe 203. By applying the present invention to the male spline section Sm of the stab shaft 200, it is possible to improve the fatigue strength of the stab shaft 200. While the stab shaft illustrated in the drawing is a solid one, it may also be formed as a hollow one.

The feature of the present invention, embodiments of which have been described, lies in the mitigation of stress concentration coefficient through an improvement in configuration, and the above-mentioned embodiments should not be construed restrictively, and the present invention is also applicable to power transmission shafts made of various materials. For example, the power transmission shaft may also be one made of steel which is not hardened through quenching. Further, the power transmission shaft may also be one made of non-iron metal, ceramic material, resin material or the like.

FIG. 29 illustrates a constant velocity universal joint 1 connected to a solid power transmission shaft 2 as described above. The constant velocity universal joint 1 mainly includes an inner joint member 3 fixed to the power transmission shaft 2, an outer joint member 4 arranged on the outer side of the inner joint member 3, and balls 5 as torque transmission members for transmitting torque between the inner joint member 3 and the outer joint member 4. The outer joint member 4 has a cup-shaped mouth member 41 and a stem portion 42 as integral or separate components. The constant velocity universal joint illustrated in the drawing is a fixed type called the zepper type. The balls 5 are arranged in a ball track formed by a track groove 3a1 formed in an outer spherical surface 3a of the inner joint member 3 and a track groove 4a1 formed in an inner spherical surface 4a of the outer joint member 4, with a plurality of balls 5 arranged at equal circumferential intervals being retained by a cage 7.

In order to realize a structure in which the contact points between the track grooves 3a1 and 4a1 and the balls 5 can assume a large operating angle without involving detachment from the track grooves 3a1 and 4a1, the center of curvature O1 of the track groove of the outer joint member 4 and the center of curvature O2 of the track groove of the inner joint member 3 are axially offset in opposite directions by the same distance with respect to the joint center O. That is, the center of curvature O1 of the track groove 4a1 of the outer joint member 4 is on the opening side, and the center of curvature O2 of the track groove 3a1 of the inner joint member 3 is on the depth side. As a result, each of the track grooves 3a and 4a is shallow on the mouth portion 41 bottom side (depth side) and deep on the mouth portion 41 opening side with respect to the center in the axial direction, forming a wedge-shaped ball track in which the radial distance gradually increases from the bottom side toward the opening side.

The outer joint member 4 is made of medium carbon steel whose carbon content is approximately 0.35 to 0.60 wt %. When the carbon content is less than 0.35 wt %, a stable high hardness cannot be attained even if induction hardening is treated, and when the carbon content exceeds 0.60 wt %, the material hardness increases, and resulting in deterioration in workability when forming the male spline section Sm described below by rolling or the like.

In the constant velocity universal joint 1, the inner joint member 3 constitutes the female member F illustrated in FIG. 3. By fit-engaging the male spline section Sm of the power transmission shaft 2 with the female spline section Sf formed in the inner periphery of the inner joint member 3, power transmission is effected between the inner joint member 3 and the power transmission shaft 2. By forming the male spline section Sm of the power transmission shaft 2 in the configuration as illustrated in FIGS. 2 through 5, it is possible to improve the fatigue strength of the power transmission shaft 2.

Apart from being formed at the connecting portion between the power transmission shaft 2 and the inner joint member 3, it is also possible for the male spline section Sm of this embodiment to be formed, as illustrated in the drawing, in the outer periphery of a stem portion 42 which is provided integrally or separately with the outer joint member 4. By fit-engaging the male spline section Sm with the female spline section Sf formed in the inner periphery of the female member F as illustrated in FIG. 30, the outer joint member 4 and the female member F are connected together so as to allow torque transmission. For example, the end surface of the female member F on the axially opposite end side (left-hand side in FIG. 30) is held in contact with a back side end surface 43 of the mouth portion 41 of the outer joint member 4, and the inner end portion on the axial end side (right-hand side in FIG. 30) is locked, for example, by a nut, whereby the female member F is axially fixed in position with respect to the outer joint member 4. The male spline section Sm of the stem portion 42 may be formed as a hollow shaft having an inner diameter of $d_i$, and it is also possible for the male spline section Sm to be formed as a solid shaft in which $d_i=0$.

Apart from the above-mentioned embodiment, the present invention is also applicable to a fixed type constant velocity universal joint of the construction as illustrated in FIG. 29, in which both the opening side end portion of the track groove 4a1 of the outer joint member 4 and the depth side end portion of the track groove 3a1 of the inner joint member 3 are formed in a configuration extending straight in the axial direction (undercut free type constant velocity universal joint).

The constant velocity universal joint 1 is not restricted to the one illustrated in the drawings, and it is also possible to use some other fixed type constant velocity universal joint, or a plunging type constant velocity universal joint such as a tripod universal joint.

FIG. 31 illustrates a tripod constant velocity universal joint 1 as an example of the plunging type constant velocity universal joint. The constant velocity universal joint 1 mainly includes an inner joint member 3 connected to a power transmission shaft 2, an outer joint member 4 arranged on the outer diameter side of the inner joint member 3, and a roller cassette 70 as a torque transmission member for transmitting torque between the inner joint member 3 and the outer joint member 4. The outer joint member 4 has a cup-shaped mouth portion 41 and a shaft-shaped stem portion 42 which are provided integrally or separately with each other, and has, at a circumferential position of division into three equal parts of the inner periphery of the mouth portion 41, an axially extending track groove 4a2. Leg shafts 35 protrude from three circumferential positions of the inner joint member 3.

The roller cassette 70 illustrated in FIG. 31 is of the double roller type. The double roller type cassette is provided, for example, with a roller (outer roller) 71 rolling in a track groove 4a2, a ring (inner roller) 72 fitted onto the leg shaft 35, and a plurality of needle rollers 73 provided between the outer roller and the inner roller. The cross-section of the leg shaft 35 is elliptical, and forms a gap between itself and the inner peripheral surface of the ring 72 in the longitudinal direction of the track groove 4a2, and is in contact with the inner peripheral surface of the ring 72 in the track groove width direction orthogonal to the longitudinal direction. A washer 75 for preventing detachment of the needle rollers 73 is attached to an annular grove formed in the inner peripheral surface of an end portion of the roller 71.

Due to the above-mentioned construction, the roller 71 is rockable with respect to the axis of the leg shaft 35. Thus, when an operating angle is assumed, it is possible to incline the inner joint member 3 with respect to the joint axis while keeping the rolling direction of the roller assembly 70 in alignment with the track groove 4a2. Thus, it is possible to achieve a reduction in induced cyclic axial load. Of course, when such a feature is not required, the roller cassette 70 may be formed as a single roller type one.

The outer joint member 4 is made of a medium carbon steel of a carbon content of approximately 0.35 to 0.60 wt %. When the carbon content is less than 0.35 wt %, it is impossible to attain a stable, high hardness even if induction hardening is treated, and when the carbon content exceeds 0.60 wt %, the material hardness increases, and the workability when forming the male spline section Sm described below by rolling or the like deteriorates.

The male spline section Sm is formed in the outer periphery of the stem portion 42 of the outer joint member 4. By fit-engaging the male spline section Sm with a female spline section Sf formed in the inner periphery of the female member F as illustrated in FIG. 3, the outer joint member 4 and the female member F are connected together so as to allow torque transmission. The female member F is fixed in position in the axial direction with respect to the outer joint member 4, for example, by holding the inner end portion on the axially opposite side thereof (left-hand side in FIG. 3) in contact with a shoulder portion 24 in the outer periphery of the outer joint member 4 and locking the inner end portion of the axial end side (right-hand side in FIG. 3) by a snap ring arranged, for example, in a snap ring groove 43 (see FIG. 31). The male spline section Sm of the stem portion 42 may be formed as a hollow shaft of an inner diameter $d_i$ as illustrated in FIG. 6. Further, it may also be formed as a solid shaft whose $d_i$=0.

Of course, as illustrated in FIG. 31, the male spline section Sm of the above-mentioned embodiment may also be formed in the outer periphery of the power transmission shaft 2 connected to the inner joint member 3 of the constant velocity universal joint 1. In this case, the female spline section Sf is formed in the inner periphery of the inner joint member 3, and torque transmission is effected between the power transmission shaft 2 and the inner joint member 3 through fit-engagement of the two spline sections.

The male spline section Sm described above may be formed not only in a tripod constant velocity universal joint but also in some other plunging type constant velocity universal joint, such as the double offset type constant velocity universal joint 1 illustrated in FIG. 32. The constant velocity universal joint 1 mainly includes the outer joint member 4, the inner joint member 3 mounted to one end of the power transmission shaft 2, torque transmission balls 7 as the torque transmission member arranged between the inner joint member 3 and the outer joint member 4, and a retainer 5 provided between the inner joint member 3 and the outer joint member 4 and supporting the torque transmission balls 7.

The outer joint member 4 has the cylindrical mouth portion 41 and the stem portion 42 which are provided integrally or separately. In the inner peripheral surface of the mouth portion 41, there are formed a plurality of linear track grooves 4a2 parallel to the axis thereof and arranged at equal circumferential intervals, and, in the outer peripheral surface of the inner joint member 3, there are formed a plurality of linear track grooves 3a2 parallel to the axis in correspondence with the track grooves 4a2 of the outer joint member 4 and arranged at equal circumferential intervals. The outer peripheral surface of the inner joint member 3 is partially spherical, and the power transmission shaft 2 is connected with the inner periphery thereof. The retainer 5 is guided by the partially spherical outer peripheral surface of the inner joint member 3 and the inner peripheral surface of the outer joint member 4 while being in contact therewith, and the inner peripheral surface and the outer peripheral surface thereof are formed as partially spherical surfaces having centers of curvature O1 and O2 offset by the same distance in the axial direction with respect to the joint center surface including the joint center O.

By forming the male spline section Sm formed in the outer joint member 4 of the constant velocity universal joint 1 in the configuration as illustrated in FIGS. 2 through 5, it is similarly possible to achieve an improvement in terms of the fatigue strength of the outer joint member 4.

FIG. 33 is a sectional view of a drive shaft having a power transmission shaft 2'. In this drive shaft, the fixed type constant velocity universal joint 1 (J1) is attached to the out-board side (outer side in the vehicle width direction when mounted in a vehicle) end portion, and the plunging type constant velocity universal joint J2 as illustrated in FIGS. 31 and 32 is attached to the in-board side (side nearer to the center in the vehicle width direction when mounted in the vehicle) end portion.

At each axial end of the power transmission shaft 2', there is formed a male spline section Sm of the configuration as illustrated in FIGS. 2 through 5, and the male spline sections Sm are fit-engaged with the female spline sections Sf of the inner joint member 3, whereby the constant velocity universal joints J1 and J2 are connected to the shaft ends so as to allow torque transmission.

As illustrated in the drawing, the power transmission shaft 2' of this embodiment is formed as a hollow shaft. In this case, the reference stress $\tau_0$ can be obtained by the following equation:

$$\tau_0 = 16Td_0/[\pi(d_0^4 - d_i^4)]$$

By effecting tuning on the configuration of the male spline section Sm so as to satisfy the relationship: $\sigma_{1max}/\Delta_0 \leq 2.7$, and $\tau_{\theta zmax}/\tau_0 \leq 2.1$, it is possible to substantially enhance the fatigue strength of the power transmission shaft 2' with respect to both tensile stress and shear stress.

The invention claimed is:

1. A power transmission shaft comprising:
a male spline section having first and second axial ends and including a valley section and a crest section, wherein
the valley section has a diameter-expanded section whose outer diameter dimension gradually increases toward the first axial end of the male spline section,
the diameter-expanded section has a pair of rounded sections at opposing circumferential sides thereof, and
each of the rounded sections has an outer periphery including a rounded periphery portion having a radius of curvature that gradually increases toward the first axial end of the male spline section.

2. A power transmission shaft according to claim 1, wherein, assuming that respective maximum values of a maximum principal stress and an axial shear stress operating on the diameter-expanded section of the male spline section when a torque T is applied are a $\sigma_{1max}$ and $\tau_{\theta zmax}$ and that a reference stress given by the following formula (1) is $\tau_0$ with respect to the torque T, a diameter $d_0$ of the valley section of the male spline section, and an inner diameter $d_i$ of the male spline section, the following formulas (2) and (3) are simultaneously satisfied:

$$\tau_0 = 16Td_0/[\pi(d_0^4 - d_i^4)] \quad (1),$$

$$\sigma_{1max} \leq 2.7\tau_0, \text{ and} \quad (2)$$

$$\tau_{\theta zmax} \leq 2.1\tau_0 \quad (3).$$

3. A power transmission shaft according to claim 2, wherein, assuming that an increase ratio of the radius of curvature of the rounded sections is dR/dL, and that an angle of a straight line connecting a small diameter end and a large diameter end of an axial cross-section of the diameter-expanded section is θ, values of the increase ratio and the angle are in the following ranges:

$$0.05 \leq dR/dL \leq 0.60, \text{ and}$$

$$5° \leq \theta \leq 20°.$$

4. A power transmission shaft according to claim 3, wherein the male spline section is hardened through quenching.

5. A power transmission shaft according to claim 2, wherein the male spline section is hardened through quenching.

6. A power transmission shaft according to claim 1, wherein the male spline section is hardened through quenching.

7. A power transmission shaft according to claim 6, wherein shot peening is further treated on the male spline section.

8. A power transmission shaft according to claim 6, wherein the male spline section is hardened by induction hardening.

9. A power transmission shaft according to claim 8, wherein shot peening is further treated on the male spline section.

10. A power transmission spline comprising:
a male member having a male spline section provided at an outer periphery of the male member; and
a female member having a female spline section provided at an inner periphery of the female member and fit-engaged with the male spline section, wherein
the male spline section has first and second axial ends and includes a valley section and a crest section,
the valley section has a diameter-expanded section whose outer diameter dimension gradually increases toward the first axial end of the male spline section,
the diameter-expanded section has a pair of rounded sections at opposing circumferential sides thereof, and
each of the rounded sections has an outer periphery including a rounded periphery portion having a radius of curvature that gradually increases toward the first axial end of the male spline section.

11. A plunging type constant velocity universal joint comprising:
an outer joint member having at an outer periphery thereof a stem portion having a male spline section;
an inner joint member arranged at an inner diameter side of the outer joint member; and
a torque transmission member provided between the outer joint member and the inner joint member and adapted to transmit torque, wherein
the male spline section has first and second axial ends and includes a valley section and a crest section,
the valley section has a diameter-expanded section whose outer diameter dimension gradually increases toward the first axial end of the male spline section,
the diameter-expanded section has a pair of rounded sections at opposing circumferential sides thereof, and
each of the rounded sections has an outer periphery including a rounded periphery portion having a radius of curvature that gradually increases toward the first axial end of the male spline section.

12. A plunging type constant velocity universal joint according to claim 11, wherein, assuming that respective maximum values of a maximum principal stress and an axial shear stress operating on the diameter-expanded section of the male spline section when a torque T is applied are $\sigma_{1max}$ and $\tau_{\theta zmax}$, and that a reference stress given by the following formula (1) is $\tau_0$ with respect to the torque T, a diameter $d_0$ of the valley section of the male spline section, and an inner diameter $d_i$ of the male spline section, the following formulas (2) and (3) are simultaneously satisfied:

$$\tau_0 = 16Td_0/[\pi(d_0^4 - d_i^4)], \quad (1)$$

$$\sigma_{1max} \leq 2.7\tau_0, \text{ and} \quad (2)$$

$$\tau_{\theta zmax} \leq 2.1\tau_0 \quad (3).$$

13. A plunging type constant velocity universal joint according to claim 12, wherein, assuming that an increase ratio of the radius of curvature of the rounded sections is dR/dL, and that an angle of a straight line connecting a small diameter end and a large diameter end of an axial cross-section of the diameter-expanded section is θ, values of the increase ratio and the angle are in the following ranges:

$$0.05 \leq dR/dL \leq 0.60, \text{ and}$$

$$5° \leq \theta \leq 20°.$$

14. A plunging type constant velocity universal joint according to claim 11, wherein the male spline section is hardened through quenching.

15. A plunging type constant velocity universal joint according to claim 14, wherein the male spline section is hardened by induction hardening.

16. A plunging type constant velocity universal joint according to claim 14, wherein shot peening is further treated on the male spline section.

17. A fixed type constant velocity universal joint comprising:
- an outer joint member having a stem portion, a mouth portion, a male spline section formed at an outer periphery of the stem portion, and a track groove formed at an inner periphery of the mouth portion;
- an inner joint member having a track groove at an outer periphery thereof;
- a plurality of torque transmission balls arranged in a ball track formed by the track groove of the outer joint member and the track groove of the inner joint member; and
- a cage retaining the torque transmission balls at equal circumferential intervals, wherein
- the male spline section has first and second axial ends and includes a valley section and a crest section,
- the valley section has a diameter-expanded section whose outer diameter dimension gradually increases toward the first axial end of the male spline section,
- the diameter-expanded section has a pair of rounded sections at opposing circumferential sides thereof, and
- each of the rounded sections has an outer periphery including a rounded periphery portion having a radius of curvature that gradually increases toward the first axial end of the male spline section.

18. A fixed type constant velocity universal joint according to claim 17, wherein, assuming that respective maximum values of a maximum principal stress and an axial shear stress operating on the diameter-expanded section of the male spline section when a torque T is applied are $\sigma_{1max}$, $\tau_{\theta zmax}$, and that a reference stress given by the following formula (1) is $\tau_0$ with respect to the torque T, a diameter $d_0$ of the valley section of the male spline section, and an inner diameter $d_i$ of the male spline section, the following formulas (2) and (3) are simultaneously satisfied:

$$\tau_0 = 16Td_0/[\pi(d_0^4 - d_i^4)], \quad (1)$$

$$\sigma_{1max} \leq 2.7\tau_0, \text{ and} \quad (2)$$

$$\tau_{\theta zmax} \leq 2.1\tau_0 \quad (3).$$

19. A fixed type constant velocity universal joint according to claim 18, wherein, assuming that an increase ratio of the radius of curvature of the rounded sections is dR/dL, and that an angle of a straight line connecting a small diameter end and a large diameter end of an axial cross-section of the diameter-expanded section is θ, values of the increase ratio and the angle are in the following ranges:

$$0.05 \leq dR/dL \leq 0.60, \text{ and}$$

$$5° \leq \theta \leq 20.$$

20. A fixed type constant velocity universal joint according to claim 17, wherein the male spline section is hardened through quenching.

* * * * *